United States Patent
Ihara

(10) Patent No.: US 10,587,542 B2
(45) Date of Patent: Mar. 10, 2020

(54) COMMUNICATION SYSTEM AND STORAGE MEDIUM FOR TRANSMITTING PHYSICAL EXPRESSION INFORMATION

(71) Applicant: SONY CORPORATION, Tokyo (JP)

(72) Inventor: Keigo Ihara, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/769,653

(22) PCT Filed: Aug. 5, 2016

(86) PCT No.: PCT/JP2016/073178
§ 371 (c)(1),
(2) Date: Apr. 19, 2018

(87) PCT Pub. No.: WO2017/081895
PCT Pub. Date: May 18, 2017

(65) Prior Publication Data
US 2018/0309703 A1    Oct. 25, 2018

(30) Foreign Application Priority Data

Nov. 13, 2015 (JP) .................................. 2015-222866

(51) Int. Cl.
*H04M 1/725* (2006.01)
*G06K 9/00* (2006.01)
*H04L 12/58* (2006.01)

(52) U.S. Cl.
CPC ........ *H04L 51/046* (2013.01); *G06K 9/00221* (2013.01); *H04L 51/10* (2013.01); *H04M 1/72552* (2013.01); *H04M 1/72555* (2013.01)

(58) Field of Classification Search
CPC .... H04L 51/046; H04L 51/10; H04W 51/066; G06K 9/00221; H04M 1/72552; H04M 1/72555; H04M 1/00
See application file for complete search history.

(56) References Cited

U.S. PATENT DOCUMENTS 9,762,719 B2 * 9/2017 Tartz ....................... G06F 3/005
2003/0117485 A1   6/2003 Mochizuki et al.
(Continued)

FOREIGN PATENT DOCUMENTS

| CN | 1427626 A | 7/2003 |
|---|---|---|
| CN | 102216876 A | 10/2011 |

(Continued)

OTHER PUBLICATIONS

Tanaka Mitsugi, Text Generation Device, Text generation auxiliary device, text generation program, and Text Generation auxiliary program, Jun. 6, 2007, Electronic Translation, whole document.*

(Continued)

*Primary Examiner* — Marisol Figueroa
(74) *Attorney, Agent, or Firm* — Chip Law Group

(57) ABSTRACT

[Object] To provide a communication system and a storage medium that are capable of transmitting physical expression information of a user via a versatile communication application.
[Solution] The communication system includes: a control unit configured to execute a communication application for directly or indirectly transmitting and receiving text information to and from a communication destination; and a communication unit configured to directly or indirectly transmit text information acquired via the communication application, to a communication destination. The control unit activates a utility in response to a request from the communication application. The utility acquires sensor data detected by a sensor, extracts specific expression information from the sensor data, converts the specific expression information into text information, and outputs the text information to the communication application.

9 Claims, 29 Drawing Sheets

(56) References Cited

U.S. PATENT DOCUMENTS

| | | | |
|---|---|---|---|
| 2008/0039124 A1* | 2/2008 | Linder | H04M 1/72544 455/466 |
| 2010/0123588 A1 | 5/2010 | Cruz Hernandez | |
| 2011/0102352 A1* | 5/2011 | Dadlani Mahtani | G06F 3/0416 345/173 |
| 2015/0070148 A1 | 3/2015 | Cruz-Hernandez et al. | |
| 2016/0070412 A1 | 3/2016 | Shimazu et al. | |
| 2018/0077095 A1* | 3/2018 | Deyle | H04L 51/10 |

FOREIGN PATENT DOCUMENTS

| | | | |
|---|---|---|---|
| EP | 1326445 | A2 | 7/2003 |
| EP | 2846225 | A2 | 3/2015 |
| GB | 2544257 | A * | 5/2017 |
| JP | 2003-248841 | A | 9/2003 |
| JP | 2007156776 | A * | 6/2007 |
| JP | 2007-280074 | A | 10/2007 |
| JP | 2008-546360 | A | 12/2008 |
| JP | 2009-157082 | A | 7/2009 |
| JP | 2011-528537 | A | 11/2011 |
| JP | 2014-170560 | A | 9/2014 |
| JP | 2014-228989 | A | 12/2014 |
| JP | 2015-053054 | A | 3/2015 |
| JP | 2015-062676 | A | 4/2015 |
| JP | 2015-167266 | A | 9/2015 |
| WO | 2010/059513 | A2 | 5/2010 |
| WO | 2013/179531 | A1 | 12/2013 |
| WO | 2014/188990 | A1 | 11/2014 |

OTHER PUBLICATIONS

International Search Report and Written Opinion of PCT Application No. PCT/JP2016/073178, dated Oct. 25, 2016, 10 pages of ISRWO.

* cited by examiner

FIG. 6

VERSATILE LOVE EXPRESSION TABLE

| CODE | SENSOR DETECTION CONDITION | NATURAL LANGUAGE | CONTENT OF LOVE EXPRESSION | ANIMATION IMAGE | SOUND EFFECT | VIBRATION |
|---|---|---|---|---|---|---|
| 0000e2a1 | It is determined that a love expression of blowing a kiss is made when movement of a hand of blowing a kiss is detected from a captured image and sound "mwah" is detected at the same time from sound collection data | MWAH! | Kiss |  | "MWAH" | SHORT VIBRATION |
| 0000e2a2 | A determination is made on the basis of pressure data measured by a touch sensor | HUG! | Hug |  | "HUG" | LONG VIBRATION |
| 0000e2a3 | A determination is made from sound collection data of heartbeats | THUMP THUMP! | Thump thump |  | "THUMP THUMP" | REPEATED SHORT VIBRATIONS |
| 0000e2a4 | It is detected that the information processing device is being shaken on the basis of acceleration data measured by an acceleration sensor | SEE YOU! | See you |  | N/A | SAME NUMBER OF TIMES OF VIBRATIONS AS NUMBER OF TIMES USER HAS SHAKEN INFORMATION PROCESSING DEVICE |

FIG. 7

VERSATILE LOVE EXPRESSION TABLE

| CODE | CONDITION FOR DETERMINING THAT THEY LOVE EACH OTHER | ANIMATION IMAGE | BGM/SOUND EFFECT |
|---|---|---|---|
| 0000e2a1 | The same love expression is replied within a predetermined period of time after one user transmits the love expression message. | | THEME MUSIC OF MOVIE "AAA" |
| 0000e2a2 | The same love expression is replied within a predetermined period of time after one user transmits the love expression message. | | MUSIC TITLE "BBB" |
| 0000e2a3 | The same love expression is replied within a predetermined period of time after one user transmits the love expression message. | | MUSIC TITLE "CCC" |
| 0000e2a4 | The same love expression is replied within a predetermined period of time after one user transmits the love expression message. | | MUSIC TITLE "DDD" |

FIG. 8

LIMITED LOVE EXPRESSION TABLE

| CODE | SENSOR DETECTION CONDITION | NATURAL LANGUAGE | CONTENT OF LOVE EXPRESSION | ANIMATION IMAGE | SOUND EFFECT | VIBRATION |
|---|---|---|---|---|---|---|
| e300e2a1 | A touchscreen display (touch sensor) is tapped three times like "tap-tap-tap" | I MISS YOU! | Miss |  | N/A | SHORT VIBRATION |

| CODE | CONDITION FOR DETERMINING THAT THEY LOVE EACH OTHER | ANIMATION IMAGE | BGM/SOUND EFFECT |
|---|---|---|---|
| e300e2a1 | The same love expression is replied within a predetermined period of time after one user transmits the love expression message. | 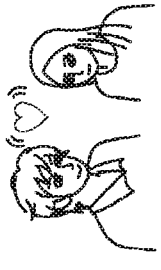 | MUSIC TITLE "EEE" |

FIG. 20
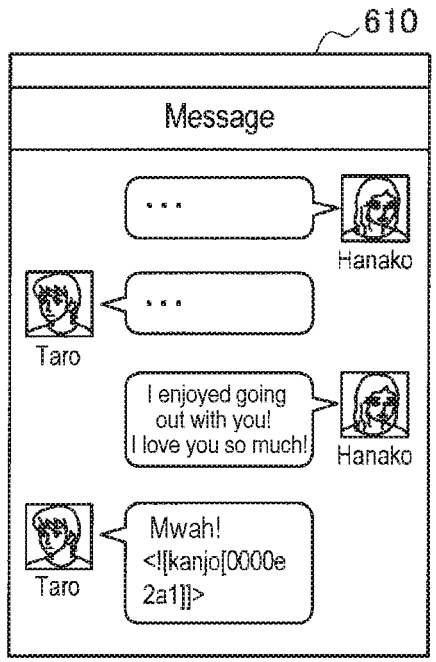
DISPLAY PATTERN IN WHICH RECEIVED LOVE EXPRESSION MESSAGE IS DISPLAYED AS IT IS
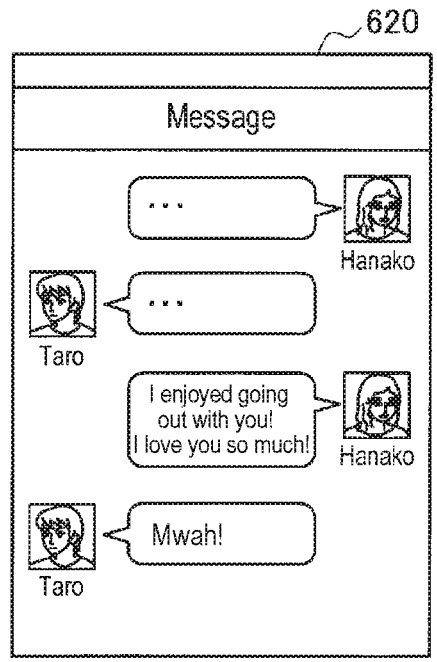
DISPLAY PATTERN IN WHICH RECEIVED LOVE EXPRESSION MESSAGE IS DISPLAYED WHILE LOVE EXPRESSION CODE IS HIDDEN
FIG. 21
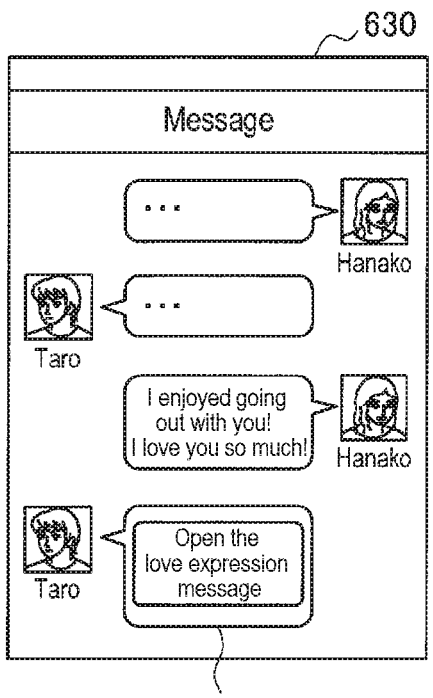

COMMUNICATION SYSTEM AND STORAGE MEDIUM FOR TRANSMITTING PHYSICAL EXPRESSION INFORMATION

CROSS REFERENCE TO RELATED APPLICATIONS

This application is a U.S. National Phase of International Patent Application No. PCT/JP2016/073178 filed on Aug. 5, 2016, which claims priority benefit of Japanese Patent Application No. JP 2015-222866 filed in the Japan Patent Office on Nov. 13, 2015. Each of the above-referenced applications is hereby incorporated herein by reference in its entirety.

TECHNICAL FIELD

The present disclosure relates to communication systems and storage media.

BACKGROUND ART

In recent years, communication technologies have been developed, and messages have been frequently exchanged via networks. It is possible for users to check messages transmitted from other terminals or to transmit messages by using information processing terminals such as smartphones, mobile phone terminals, or tablet terminals.

In general, messages are input via a virtual keyboard or a numeric keypad. The virtual keyboard is displayed on a display unit of an information processing terminal, and the numeric keypad is provided on a terminal. In addition, as technologies of inputting messages, for example, the following technologies are proposed.

Patent Literatures 1 and 2 listed below disclose systems for transmitting haptic messages. According to Patent Literatures 1 and 2, it is possible to detect gesture of a user and transmit a message to a target receiver.

In addition, Patent Literature 3 listed below discloses a method for generating message composer's state information from sentences in the message, voice, blood pressure, heartbeats, and facial expression, attaching the message composer's state information to the message, transmitting the message, and outputting the composer's state information from a receiver side by using an output means (LCD, sub-LCD, LED, vibrator, or speaker) based on the composer's state information.

CITATION LIST

Patent Literature

Patent Literature 1: JP 2014-170560A
Patent Literature 2: JP 2011-528537T
Patent Literature 3: JP 2008-546360T

DISCLOSURE OF INVENTION

Technical Problem

However, every technologies according to the Patent Literatures listed above requires a dedicated processing program to be installed in both a message transmission side terminal and a message reception side terminal. Therefore, these technologies lack versatility, and it is not convenient for users to use them.

Accordingly, the present disclosure proposes a communication system and a storage medium that are capable of transmitting physical expression information of a user via a versatile communication application.

Solution to Problem

According to the present disclosure, there is provided a communication system including: a control unit configured to execute a communication application for directly or indirectly transmitting and receiving text information to and from a communication destination; and a communication unit configured to directly or indirectly transmit text information acquired via the communication application, to a communication destination. The control unit activates a utility in response to a request from the communication application. The utility acquires sensor data detected by a sensor, extracts specific expression information from the sensor data, converts the specific expression information into text information, and outputs the text information to the communication application.

According to the present disclosure, there is provided a storage medium having a program stored therein, the program causing a computer to function as: a control unit configured to execute a communication application for directly or indirectly transmitting and receiving text information to and from a communication destination; and a communication unit configured to directly or indirectly transmit text information acquired via the communication application, to a communication destination. The control unit activates a utility in response to a request from the communication application. The utility acquires sensor data detected by a sensor, extracts specific expression information from the sensor data, converts the specific expression information into text information, and outputs the text information to the communication application.

Advantageous Effects of Invention

As described above, according to the present disclosure, it is possible to transmit physical expression information of a user via a versatile communication application.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram illustrating a first example of a versatile love expression information table according to the embodiment.

FIG. 7 is a diagram illustrating a second example of a versatile love expression information table according to the embodiment.

FIG. 8 is a diagram illustrating an example of a limited love expression information table according to the embodiment.

FIG. 20 is a diagram illustrating methods for displaying text included in a love expression message on a communication AP according to the embodiment.

FIG. 21 is a diagram illustrating a method for calling a love expression message according to the embodiment.

MODE(S) FOR CARRYING OUT THE INVENTION

Figure 1:
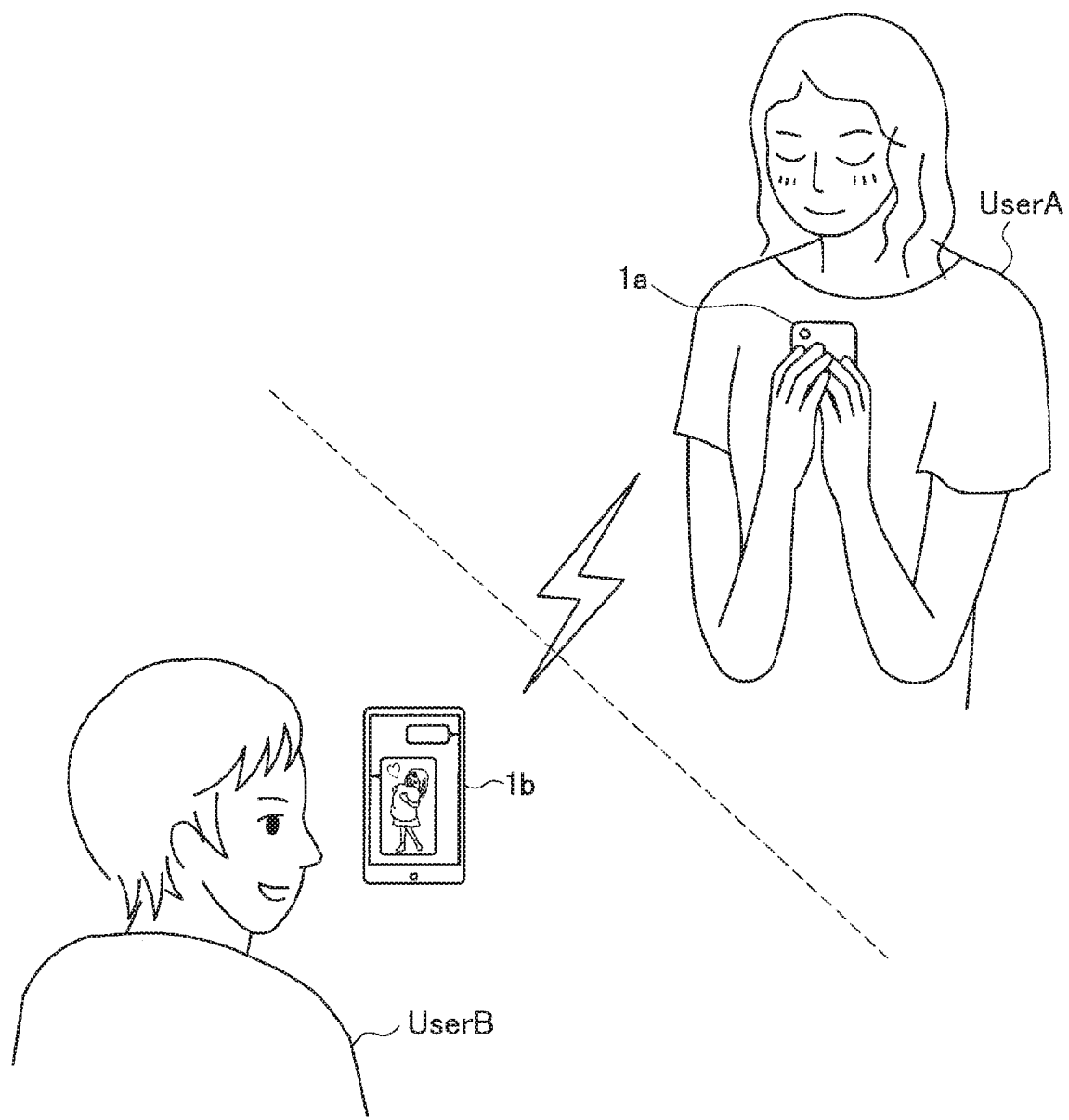
FIG. 1 is a diagram illustrating an overview of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview of information processing system according to embodiment of present disclosure
2. Configuration
2-1. Configuration of server
2. Configuration of information processing device
3. Operation process
3-1. Love expression transmission process
3-2. Love expression reception process
3-3. Live streaming process
4. Conclusion 1. OVERVIEW OF INFORMATION PROCESSING SYSTEM ACCORDING TO EMBODIMENT OF PRESENT DISCLOSURE When using an information processing system according to the embodiment, it is possible to transmit physical expression information of a user via a versatile communication application.

In other words, in general, a message is created by inputting text and transmitted to a partner when chatting via a versatile communication tool capable of exchanging a message. However, the information processing system according to the embodiment is useful when a user is busy, when a user is doing another work and cannot reply immediately, or when a user wants to express his/her love to a partner without using a word. FIG. 1 is a diagram illustrating an overview of the information processing system according to the embodiment. As illustrated in FIG. 1, when a user A clutches an information processing device 1*a* in her hand while users are text chatting with each other by using information processing devices 1*a* and 1*b* and versatile communication tools, a touch sensor provided on the information processing device 1*a* recognizes that the information processing device 1*a* is clutched by hands. In addition, for example, such love expression from the user A is displayed on the information processing device 1*b* as an illustration of a girl hugging a pillow. It is possible to tell a feeling of the user A to the partner without using a word. In addition, in the case where the user A is busy and cannot type text, it is possible to transmit a message to a partner by waving her hand to the information processing device 1a or blowing a kiss to the information processing device 1a, for example.

Figure 2:
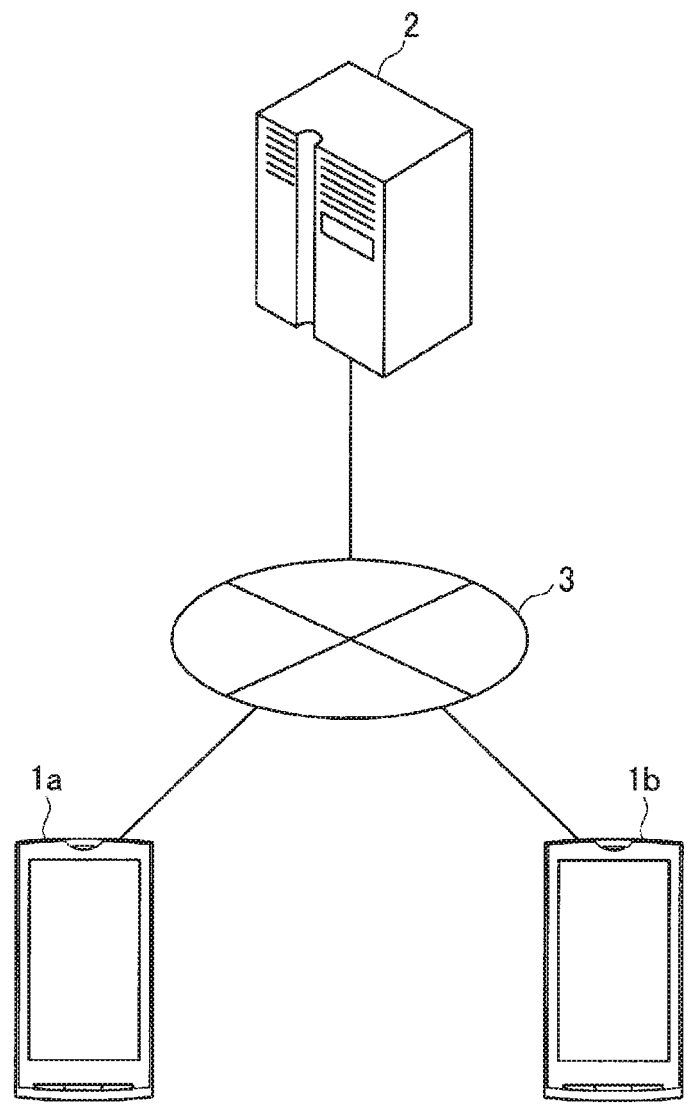
FIG. 2 is a diagram illustrating a system configuration of the information processing system according to the embodiment.

Next, FIG. 2 illustrates a system configuration of such an information processing system according to the embodiment. As illustrated in FIG. 2, the information processing system according to the embodiment includes the information processing devices 1a and 2b, and an expression management server 2. They are connected via a network 3.

The information processing devices 1a and 1b are capable of text charring via a versatile communication application. Note that, a server configured to execute such a communication application is not illustrated.

The expression management server 2 has a function of storing various kinds of information related to love expressions according to the embodiment. The expression management server 2 transmits target love expression information in response to a request from the information processing device 1a or 1b.

2. CONFIGURATION

<2-1. Configuration of Server>

Figure 3:
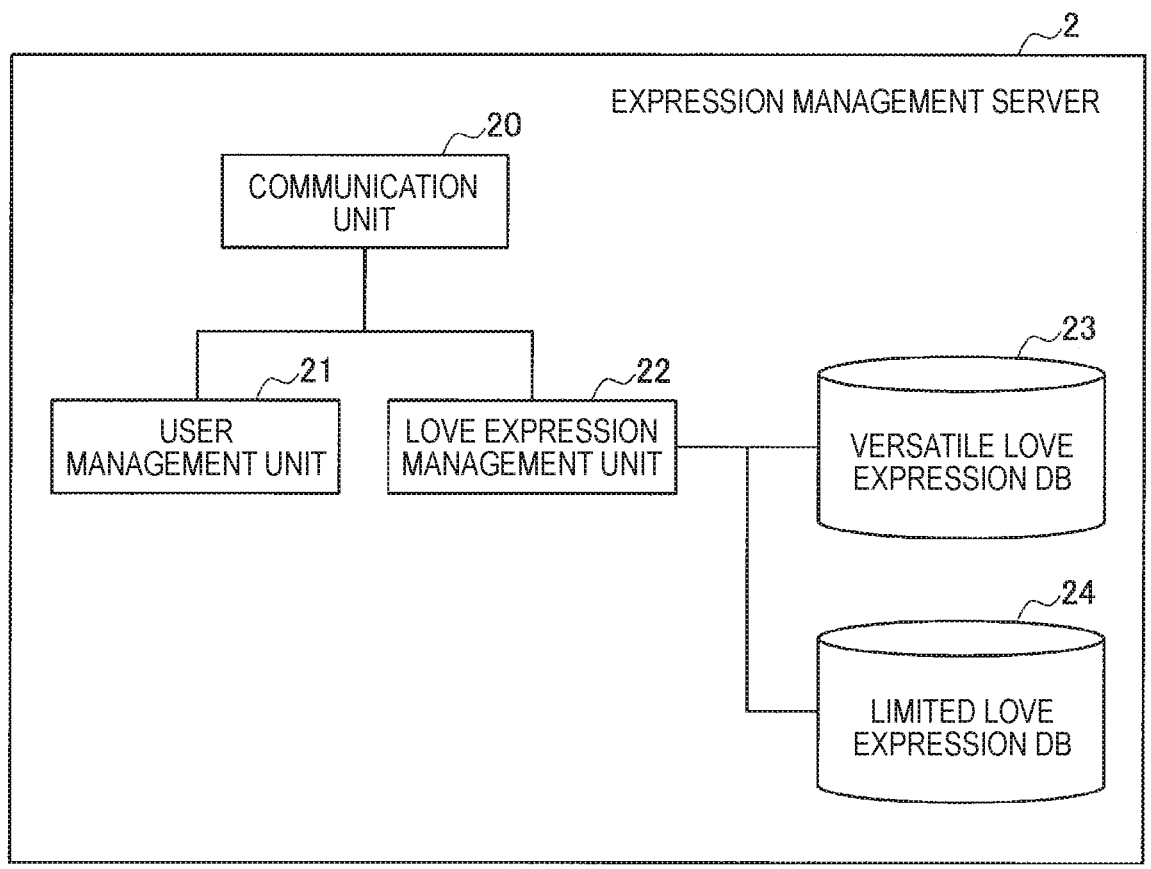
FIG. 3 is a block diagram illustrating an example of a configuration of an expression management server according to the embodiment.

FIG. 3 is a block diagram illustrating an example of a configuration of the expression management server 2 according to the embodiment. As illustrated in FIG. 3, the expression management server 2 includes a communication unit 20, a user management unit 21, a love expression management unit 22, a versatile love expression database (DB) 23, and a limited love expression DB 24.

The communication unit 20 transmits and receives data to and from an external device in a wired/wireless manner. For example, the communication unit 20 connects with the information processing devices 1 and transmits and receives love expression data.

The user management unit 21 manages registration, deletion, and the like of user information.

The love expression management unit 22 manages registration, deletion, and the like of love expression information stored in the versatile love expression DB 23 and the limited love expression DB 24. In this embodiment, versatile love expressions understandable to anyone are managed in the versatile love expression DB 23, and limited love expressions understandable only to a specific group are managed in the limited love expression DB 24. The limited love expression information can be mutually used after a partner side registers such information.

<2. Configuration of Information Processing Device>

Figure 4:
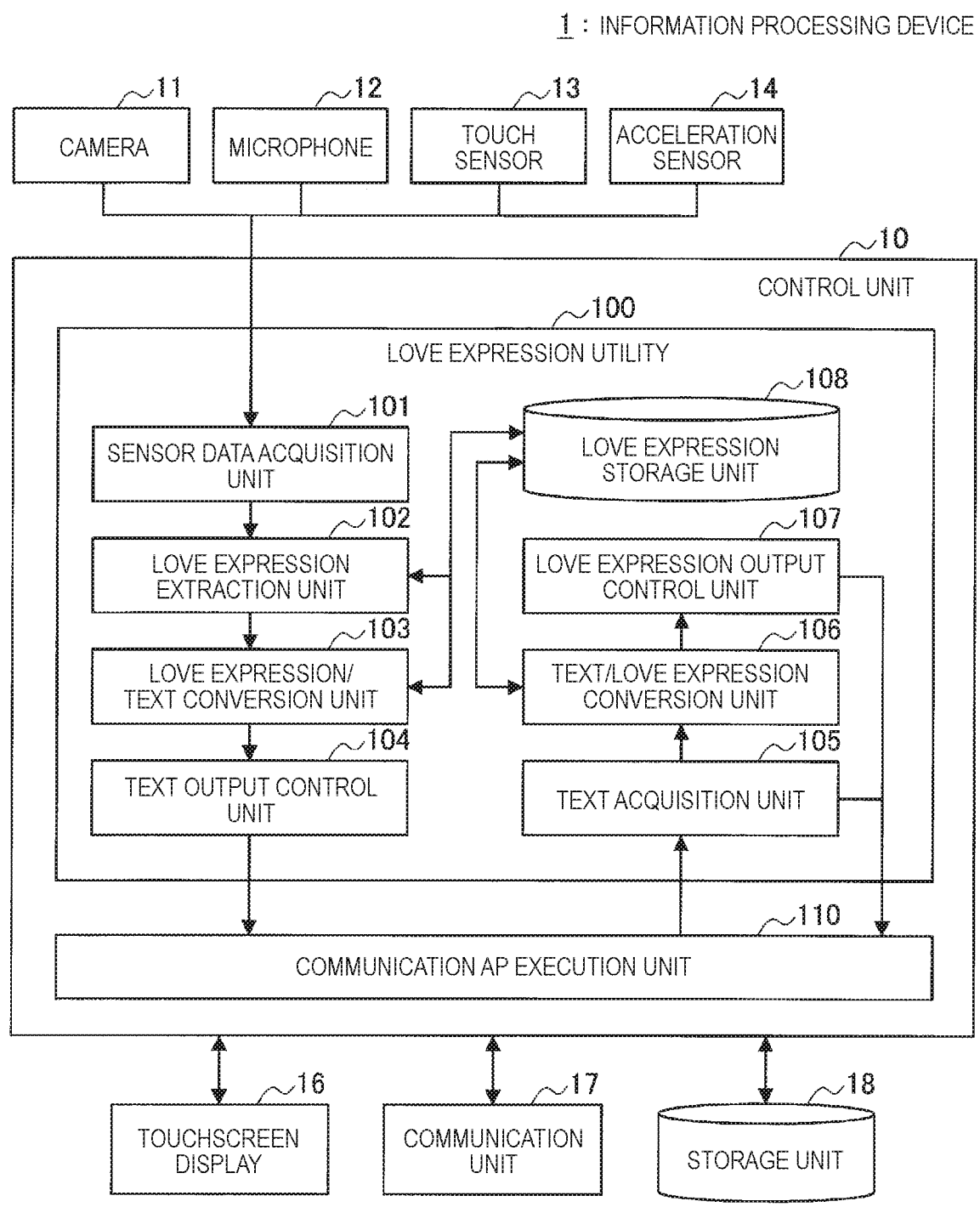
FIG. 4 is a block diagram illustrating an example of a configuration of an information processing device 1 according to the embodiment.

FIG. 4 is a block diagram illustrating a configuration example of the information processing device 1 according to the embodiment. As illustrated in FIG. 4, the information processing device 1 includes a control unit 10, a camera 11, a microphone 12, a touch sensor 13, an acceleration sensor 14, a touchscreen display 16, a communication unit 17, and a storage unit 18.

The control unit 10 functions as an arithmetic processing device and a control device to control all operation performed in the information processing device 1 in accordance with various kinds of programs. For example, the control unit 10 is implemented by a central processing unit (CPU), and an electronic circuit such as a microprocessor or the like. In addition, as illustrated in FIG. 4, the control unit 10 according to the embodiment may function as a love expression utility 100 and a communication application (AP) execution unit 110.

The communication AP execution unit 110 executes a versatile communication application, displays a text chatting screen on the touchscreen display 16, for example, and transmits a text message input into the text chatting screen to a partner via the communication unit 17.

The love expression utility 100 may cooperate with a communication AP, and may be called via a leading path (such as an icon) to the love expression utility to be displayed on the text chatting screen, for example. Alternatively, the love expression utility 100 may be called and activated at a timing when a message input screen (in other words, chatting screen) is displayed by the communication AP. As illustrated in FIG. 4, the love expression utility 100 functions as a sensor data acquisition unit 101, a love expression extraction unit 102, a love expression/text conversion unit 103, a text output control unit 104, a text acquisition unit 105, a text/love expression conversion unit 106, a love expression output control unit 107, and a love expression storage unit 108.

When the love expression utility 100 is called, the sensor data acquisition unit 101 enters a state of waiting for input from the camera 11, the microphone 12, or various sensors such the touch sensor 13 (touchscreen display 16 and touch sensors installed in other places) or as the acceleration sensor 14. The sensor data acquisition unit 101 outputs sensor data detected and input by the various sensors, to the love expression extraction unit 102.

The love expression extraction unit 102 extracts love expression information from various kinds of sensor data. At this time, the love expression extraction unit 102 extracts love expression information from the input sensor data with reference to love expression information stored in the love expression storage unit 108.

Figure 5:
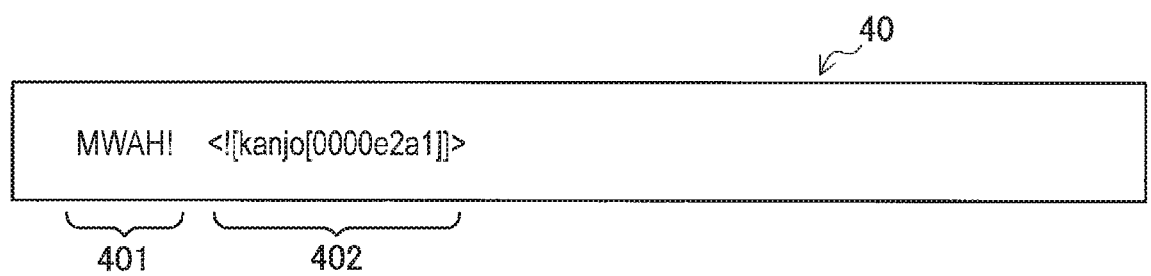
FIG. 5 is a diagram illustrating an example of text information converted from love expression information according to the embodiment.

The love expression/text conversion unit 103 converts love expression information extracted by the love expression extraction unit 102 into text information (love expression message). At this time, the love expression/text conversion unit 103 converts the extracted love expression information into text information, also with reference to love expression information stored in the love expression storage unit 108. By converting the text information, it is possible to use a versatile communication tool that deals with text only, for example. Here, FIG. 5 illustrates an example of the converted text information. As illustrated in FIG. 5, text information (love expression message) 40 according to the embodiment includes a code 402 and a natural language 401. The code 402 is understandable to the love expression utility 100, and the natural language 401 is readable for human beings. In the code 402, "0000e2a1" is a code body. For example, the code body is represented by using four bytes in hexadecimal, for example. In addition, to prevent such a code from being displayed as it is in the versatile communication tool, predetermined symbols and a code noted in brackets after "kanjo" may be hidden. It is assumed that the natural language 401 is displayed as it is in the versatile communication tool.

The text output control unit 104 passes the text information (love expression message) converted by the love expression/text conversion unit 103 to the communication AP execution unit 110, and the communication AP execution unit 110 transmits the text information to a partner via the communication unit 17.

The love expression storage unit 108 stores a versatile love expression information table and a limited love expression information table. The versatile love expression information table is a latest table received from the expression management server 2 via the communication unit 17. On the other hand, the limited love expression information table is registered through user operation. The limited love expression information table is a table received from the expression management server 2 via the communication unit 17 as necessary. Here, FIG. 6 to FIG. 8 illustrates examples of the love expression information table.

FIG. 6 is a diagram illustrating a first example of the versatile love expression information table. As illustrated in FIG. 6, love expression codes, sensor detection conditions, natural languages, love expression contents, animation images, sound effects, and vibrations are included. Here, the animation images are associated as an example. However, the embodiment is not limited thereto. Still images may be associated. In addition, the sound effects and vibrations are love expression information to be output at a time of presenting the animation images to the reception side. In addition, the sensor detection conditions are referred to at a time when the love expression extraction unit 102 extracts love expression information on the basis of acquired sensor data. In addition, the codes and the natural languages are referred to by the love expression/text conversion unit 103 at a time of converting a love expression into text information (love expression message). In addition, the love expression table is used not only by the love expression utility 100. The love expression information may be accessible for other applications. In this case, for example, the love expression table may be referred to by the communication AP, and it is possible to perform conversion to an original image or emoji corresponding to a love expression message received from a partner side. To make general communication tools understand a meaning of such a love expression message, each love expression table includes a "content of love expression" field. For example, in the case where the general communication tool refers to a love expression table and a love expression content corresponding to a code indicates "see you", the general communication tool performs conversion into an original image, emoji, or the like that indicates a character waving his hand, and displays the original image, emoji, or the like on a text chatting screen.

FIG. 7 is a diagram illustrating a second example of the versatile love expression information table. In this embodiment, in the case where a love expression message is transmitted to a partner and then the same love expression message is transmitted as a reply from the partner under a given condition, it is determined that they love each other, and a love expression is presented. Details thereof will be described later. FIG. 7 is a diagram illustrating examples of versatile love expression information indicating that they love each other. Here, information such as codes, conditions for determining that they love each other, animation images, BGMs/sound effects are associated. For example, a first row is an expression indicating that they love each other in the case where they express their love by blowing a kiss, a second row is an expression indicating that they love each other in the case where they express their love by clutching their device by their both hands, a third row is an expression indicating that they love each other in the case where they record their heartbeats, and a fourth row is an expression indicating that they love each other in the case where they wave their hand.

FIG. 8 is a diagram illustrating examples of the limited love expression information table. As described above, the limited love expression information table is a table that stores information related to love expressions exclusively for specific users. Its data format is the same as the versatile love expression table. Here, for example, tapping on a touchscreen three times means a love expression indicating that I miss you. For example, such a love expression is associated with an animation image showing a person looking at a partner.

The process performed by a love expression transmission side has been mainly described above. Next, a process performed by a love expression reception side will be described.

Via the communication unit 17, the text acquisition unit 105 acquires text information (love expression message) from information transmitted from a partner side from the communication AP. As described with reference to FIG. 5, the text information (love expression message) includes a natural language describing a love expression. Therefore, it is possible to pass the natural language as it is to the communication AP execution unit 110 and display the natural language on a chatting screen. On the other hand, in the case where the reception side also has the love expression utility 100, the love expression utility 100 is called from the communication AP through inter-application communication or the like, the text information (love expression message) is passed, and a code is decoded by the text/love expression conversion unit 106 (to be described later), and a love expression image is displayed on a screen.

The text/love expression conversion unit 106 converts the acquired text information into a love expression with reference to the love expression table stored in the love expression storage unit 108. Specifically, the text/love expression conversion unit 106 decodes the code, and extracts a corresponding animation image from the love expression storage unit 108.

The love expression output control unit 107 outputs the love expression information converted by the text/love expression conversion unit 106 to the communication AP execution unit 110. The communication AP execution unit 110 displays the love expression information (specifically, animation image) on the chatting screen under the control of the love expression output control unit 107.

The communication unit 17 transmits and receives data to and from an external device in a wired/wireless manner.

The storage unit 18 is implemented as read only memory (ROM) or random access memory (RAM). The ROM stores programs, operation parameters, and the like that are used in processes performed by the control unit 10, and the RAM temporarily stores a parameters and the like that arbitrarily change.

Details of the respective structural elements of the information processing system according to the embodiment have been described above. Next, operation processes according to the embodiment will be described.

3. OPERATION PROCESS

<3-1. Love Expression Transmission Process>

Figure 9:
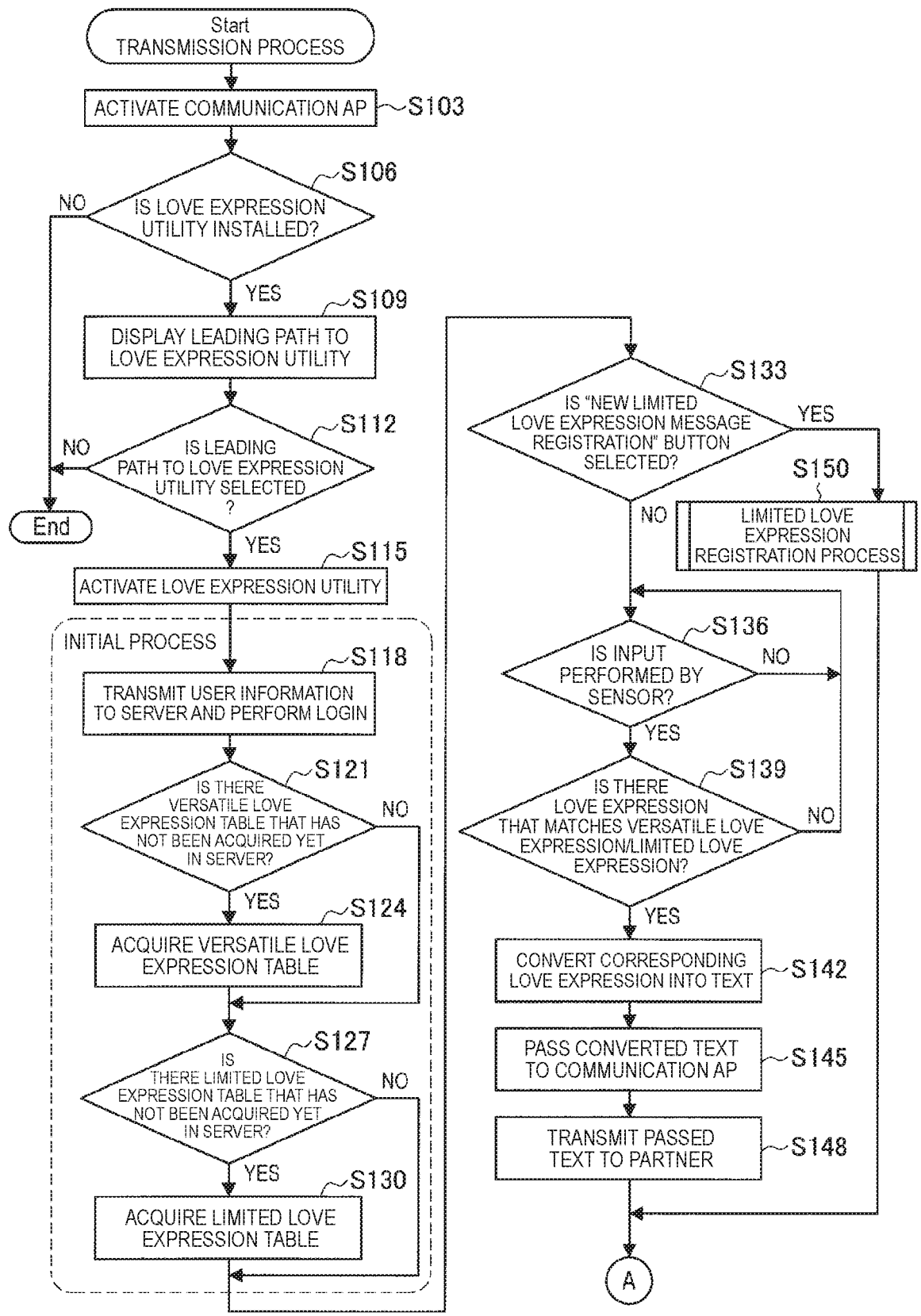
FIG. 9 is a flowchart illustrating a love expression transmission process according to the embodiment.

FIG. 9 is a flowchart illustrating a love expression transmission process according to the embodiment. As illustrated in FIG. 9, the information processing device 1 first activates the communication AP (Step S103), and checks whether the love expression utility is installed (Step S106).

Figure 10:
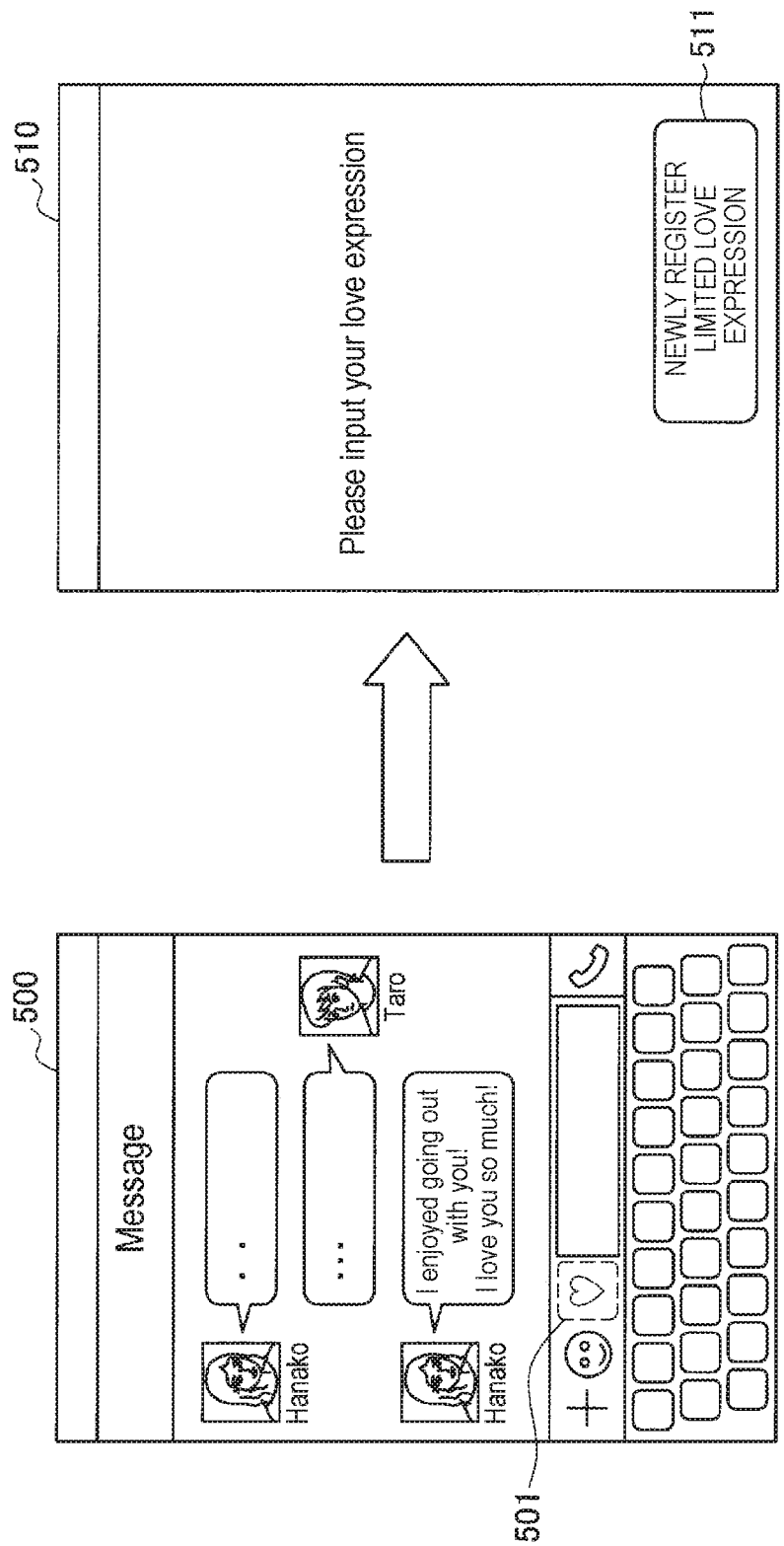
FIG. 10 is a diagram illustrating an example of displaying a leading path to a love expression utility according to the embodiment.

Next, in the case where the love expression utility is installed (YES in Step S106), a leading path to the love expression utility is displayed on the chatting screen of the communication AP (Step S109). In the case where the leading path to the love expression utility is selected (YES in Step S112), the information processing device 1 activates the love expression utility (Step 115). Here, FIG. 10 illustrates a screen display example according to the embodiment. As illustrated in the left side of FIG. 10, the communication AP displays a chatting screen 500 using text messages, and further displays a call button 501 serving as the leading path to the love expression utility. When the call button 501 is tapped, a display screen 510 of the love expression utility is displayed as illustrated in the right side of FIG. 10. In the display screen 510, "Please input your love expression." is displayed, and a button 511 for newly registering a limited love expression is also displayed.

On the other hand, in the case where the love expression utility is not installed (NO in Step S106), or in the case where the leading path to the love expression utility is not selected (NO in Step S112), the love expression transmission process ends.

Next, as an initial process for transmitting a love expression, a love expression table is updated through Steps S118 to S130 to be described below.

Specifically, the information processing device 1 transmits user information to the expression management server 2 and logs into the expression management server 2 (Step S118). In the case where there is a versatile love expression table that has not been acquired yet in the server (YES in Step S121), the information processing device 1 acquires the versatile love expression table (Step S124). In addition, in the case where there is a limited love expression table that has not been acquired yet in the server (YES in Step S127), the information processing device 1 acquires the limited love expression table (Step S130). The respective acquired love expression tables are stored in the love expression storage unit 108.

Next, in the case where the button 511 for newly registering a limited love expression is selected (YES in Step S133), the information processing device 1 performs a process for newly registering a limited love expression (Step S150). Such a registration process will be described later with reference to FIG. 11 to FIG. 14.

Next, in the case where the user makes a physical love expression such as clutching or shaking the information processing device 1 and data detected by various sensors is input into the sensor data acquisition unit 101 of the information processing device 1 (YES in Step S136), the love expression extraction unit 102 refers to the love expression storage unit 108, and determines whether there is a love expression that matches a versatile love expression/limited love expression on the basis of sensor data (Step S139). The love expressions may be assumed to be movements such as blowing a kiss, clutching the information processing device 1, allowing a partner to listen to heartbeats (attaching the information processing device 1 to his/her chest and collecting heartbeat sound via the microphone 12), or waving a hand. In the case of blowing a kiss, movements of a hand of a user is detected from a video taken by the camera 11 of the information processing device 1, and it is determined that this movement is a love expression of blowing a kiss if sound such as "mwah" is detected from the microphone 12 at the same time.

Next, in the case where there is a matched love expression (YES in Step S139), the love expression/text conversion unit 103 converts the love expression into text information (love expression message) (Step S142).

Next, the text output control unit 104 passes the converted text information to the communication AP (Step S145), and the communication AP execution unit 110 transmits the passed text information to a partner communicating with via the chatting screen.

(Registration Process)

Figure 11:
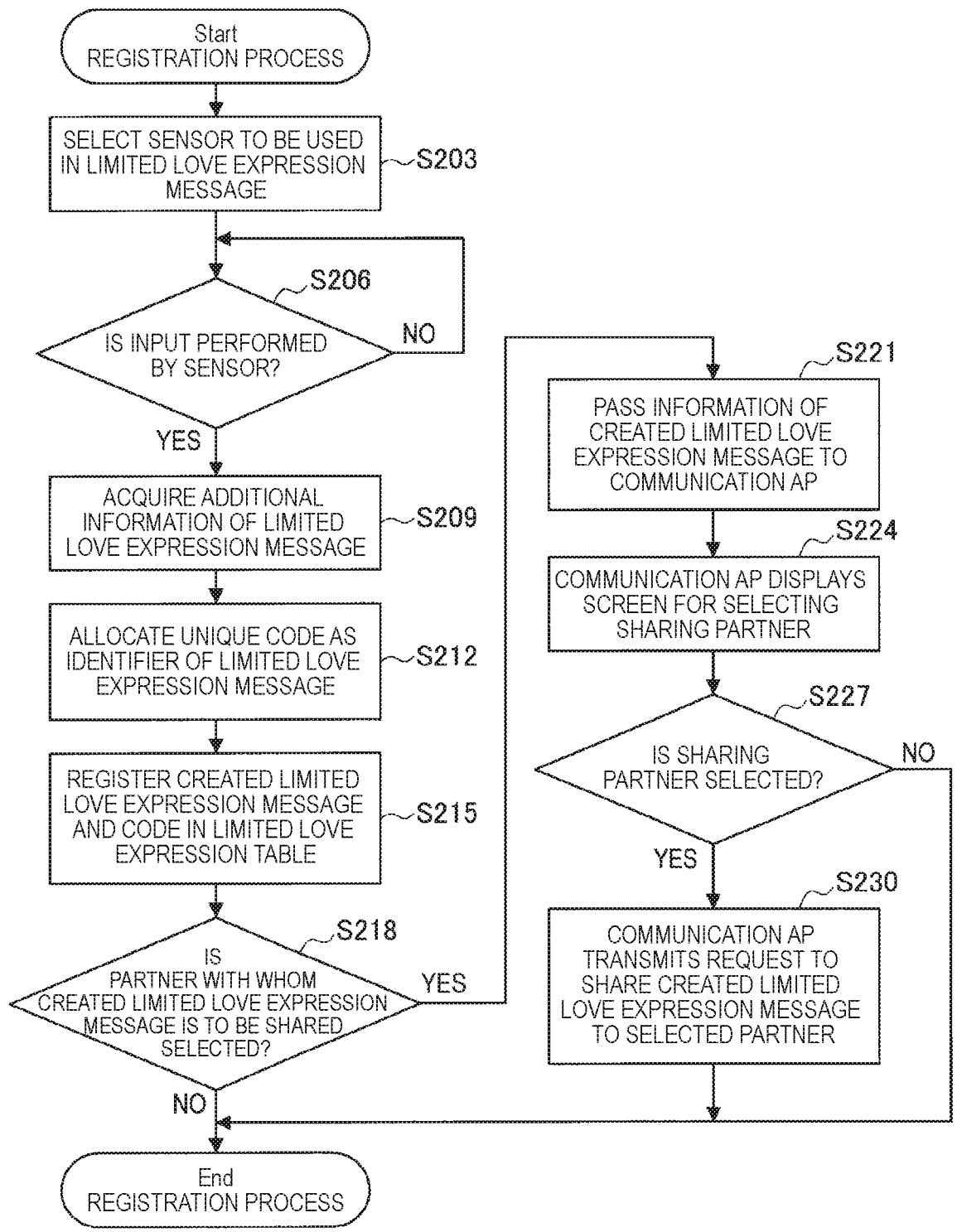
FIG. 11 is a flowchart illustrating a limited love expression registration process according to the embodiment.

Next, with reference to FIG. 11 to FIG. 17, the limited love expression registration process in Step S150 will be described. FIG. 11 is a flowchart illustrating the limited love expression registration process according to the embodiment.

Figure 12:
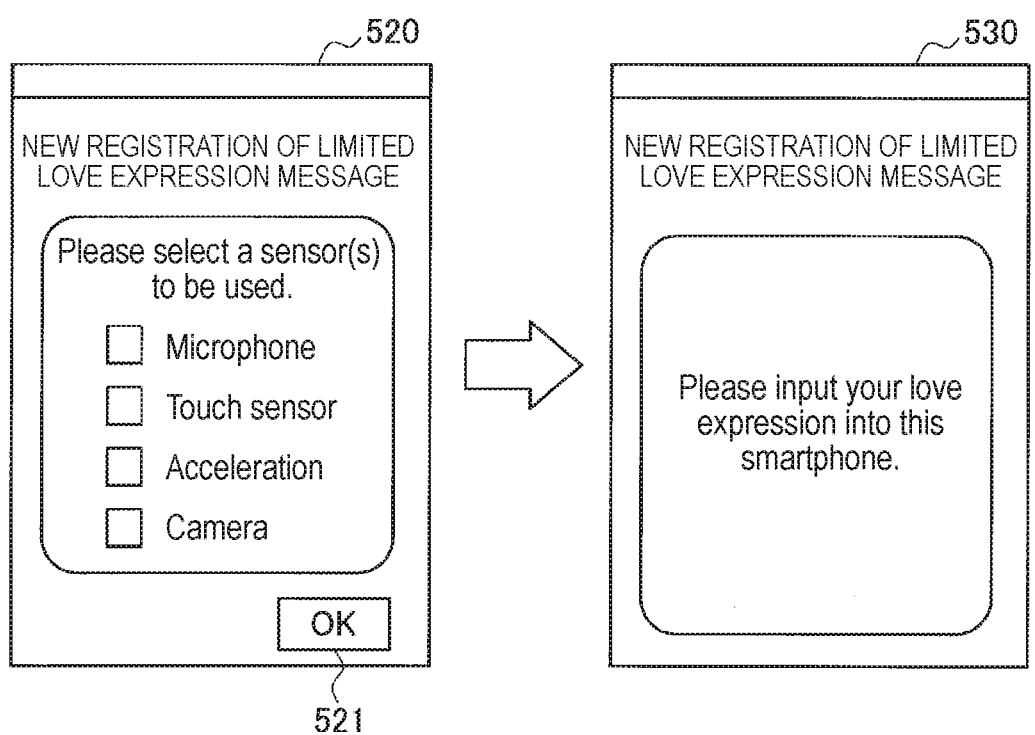
FIG. 12 is a diagram illustrating an example of a limited love expression message registration screen according to the embodiment.

As illustrated in FIG. 11, the love expression utility 100 of the information processing device 1 first receives selection of a sensor to be used in a limited love expression message in response to user operation (Step S203). Here, FIG. 12 illustrates an example of a limited love expression message registration screen. A registration screen 520 illustrated in the left side of FIG. 12 is a screen displayed after tapping the new registration button 511 in the screen 510 illustrated in FIG. 10. In the registration screen 520, it is possible to select a sensor to be used from a microphone, a touch sensor, an acceleration, and a camera. When selecting at least one of them and tapping an OK button 521, a screen 530 illustrated in the right side of FIG. 12 is displayed. In the screen 530, "Please input your love expression into this smartphone" is displayed, and the user makes a love expression that the user wants to newly register.

Figure 13:
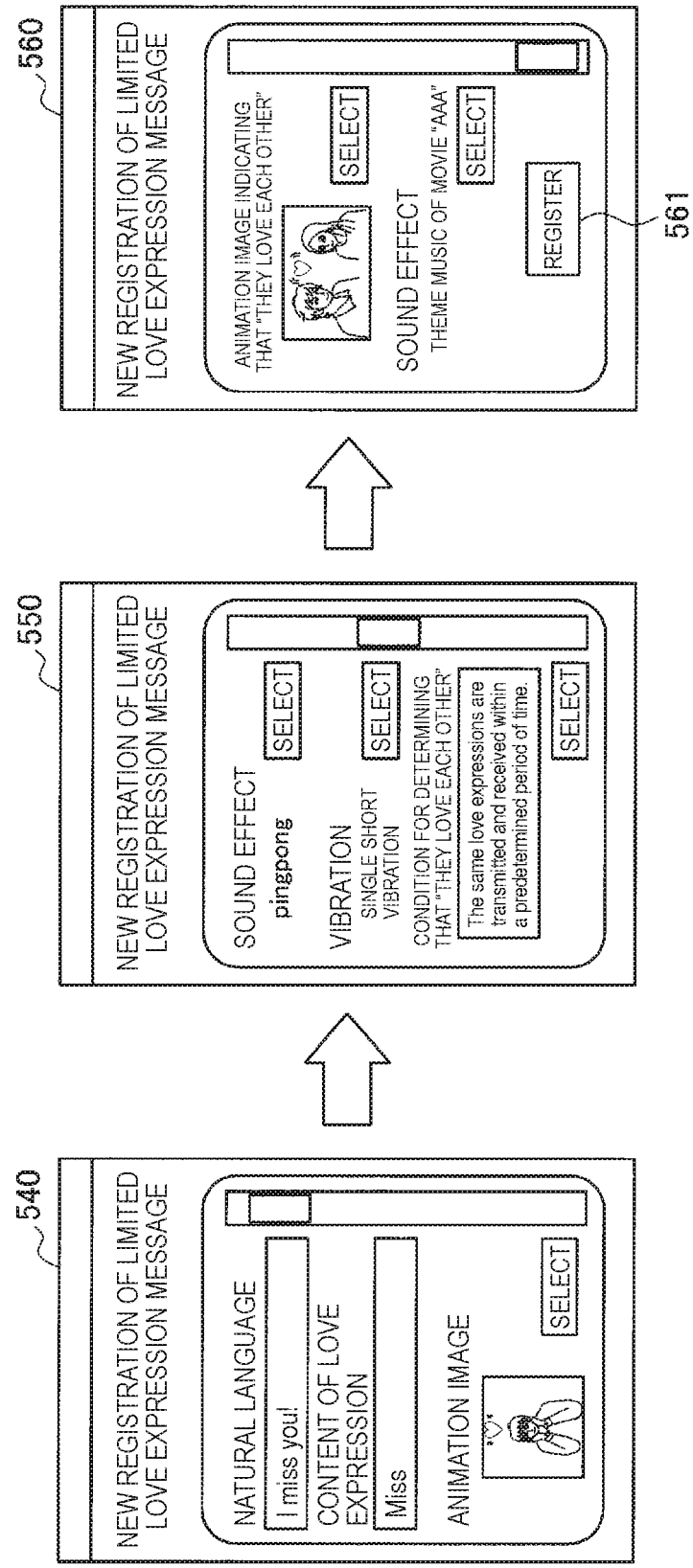
FIG. 13 is a diagram illustrating an example of an input screen of additional information of a limited love expression message according to the embodiment.

Next, in the case where the user express love and the selected sensor receives input (YES in Step S206), the love expression utility 100 acquires additional information of the limited love expression message. Here, FIG. 13 illustrates input screen examples of the additional information of the limited love expression message. Input screens 540 to 560 illustrated in FIG. 13 are screens sequentially displayed when scrolling the screen to the bottom. Via the input screen 540, a natural language of a love expression, contents of the love expression, and an animation image that the user wants to register are input. Via the input screen 550, a sound effect and vibration to be output together with the animation image, and a condition for determining that they love each other are input. Via the input screen 560, an animation image indicating that they love each other and a sound effect are input. Next, when a registration button 561 is tapped, the love expression utility 100 acquires the input information as additional information.

Next, the love expression utility 100 allocates a unique code as an identifier of the limited love expression message (Step S212).

Next, the love expression utility 100 registers the created limited love expression message and the code in the limited love expression table of the love expression storage unit 108 (Step S215).

Figure 14:
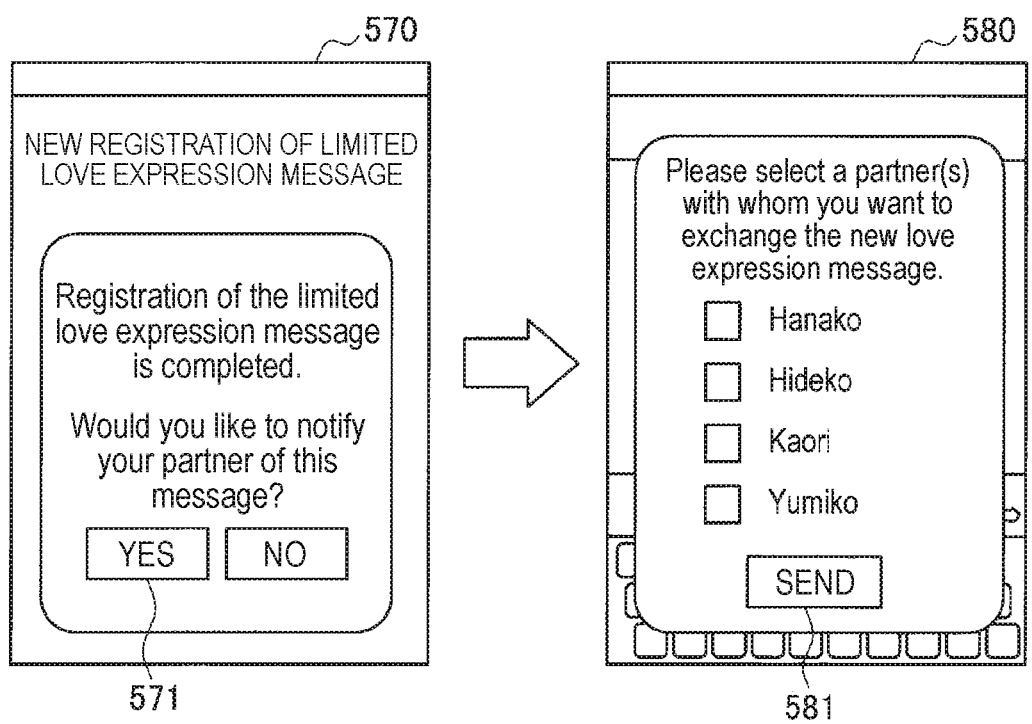
FIG. 14 is a selection screen for selecting a partner for sharing a limited love expression message according to the embodiment.

Next, in the case where a partner with whom the created limited love expression message is to be shared is selected (YES in Step S218), the love expression utility 100 passes information of the created limited love expression message to the communication AP execution unit 110 (Step S221). The communication AP execution unit 110 displays a selection screen for selecting a sharing partner (Step S224). Here, FIG. 14 illustrates a selection screen for selecting a partner for sharing a limited love expression message. As illustrated in the left side of FIG. 14, the selection screen 570 displays a screen that indicates completion of registration of a new limited love expression message and asks whether to notify a partner of the completion. The selection screen 570 is displayed by the love expression utility 100. When the user selects a "YES" button 571, a selection screen 580 illustrated in the right side of FIG. 14 is displayed. The selection screen 580 is displayed by the communication AP execution unit 110. In the selection screen 580, names of specific partner users are listed. The user selects a partner user that the user wants to communicate with by using the limited love expression message that has been newly registered, and taps a send button 581.

Next, in the case where a partner with whom the limited love expression message is to be shared is selected in the selection screen 580 (YES in Step S227), the communication AP execution unit 110 transmits a request to share the created limited love expression message to the selected partner (Step S230). On the other hand, in the case where the sharing partner is not selected (NO in Step S227), the sharing request is not transmitted and this process ends.

Figure 15:
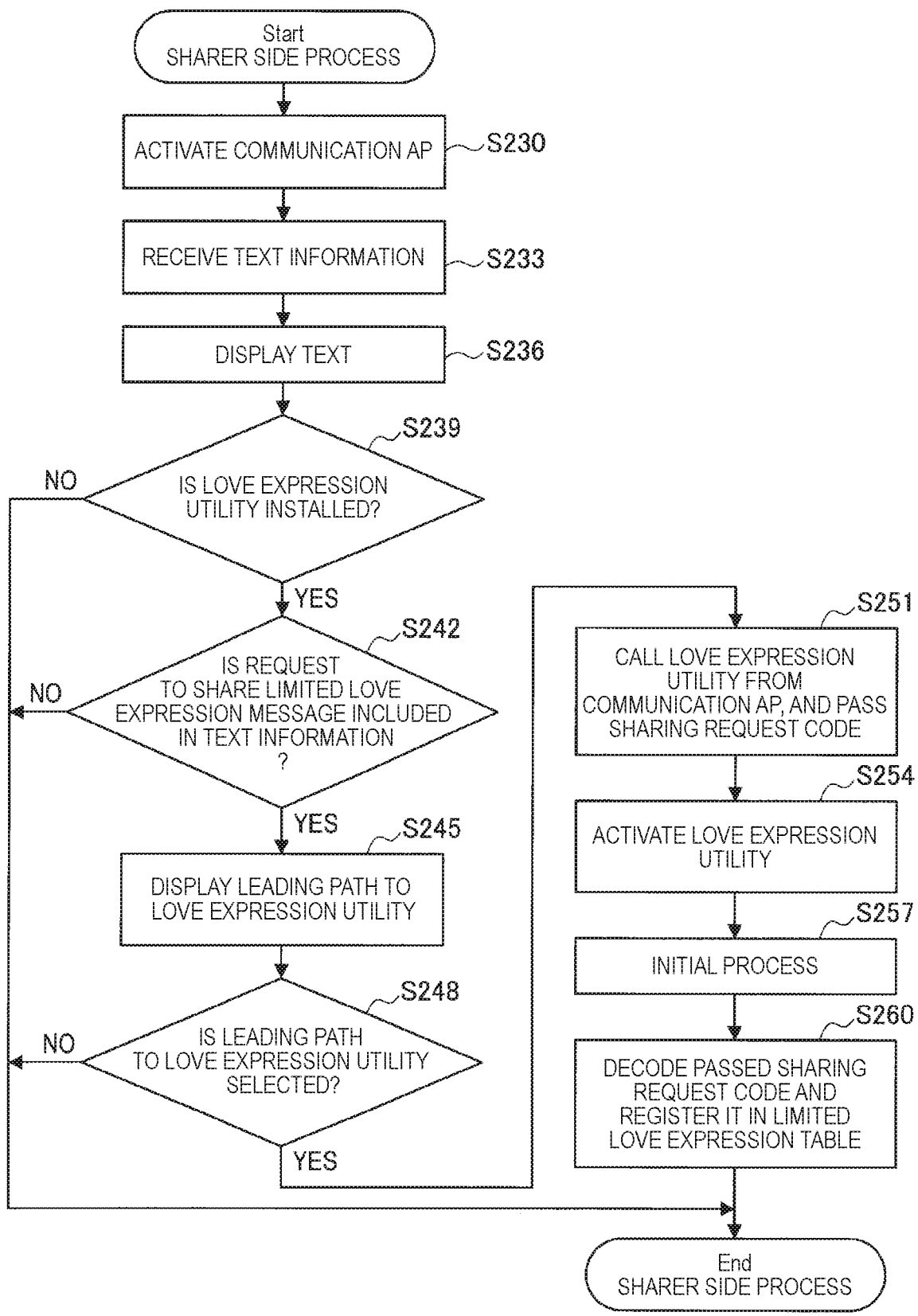
FIG. 15 is a flowchart illustrating a process performed by a sharer side at a time of limited love expression registration according to the embodiment.

FIG. 15 is a flowchart illustrating a process performed by a sharer side at a time of limited love expression registration according to the embodiment. As illustrated in FIG. 15, the information processing device 1 of the sharer side first activates the communication AP (Step S230).

Next, text information is received from the partner user via the communication AP (Step S233).

Next, the communication AP execution unit 110 displays the received text information (Step S236).

Figure 16:
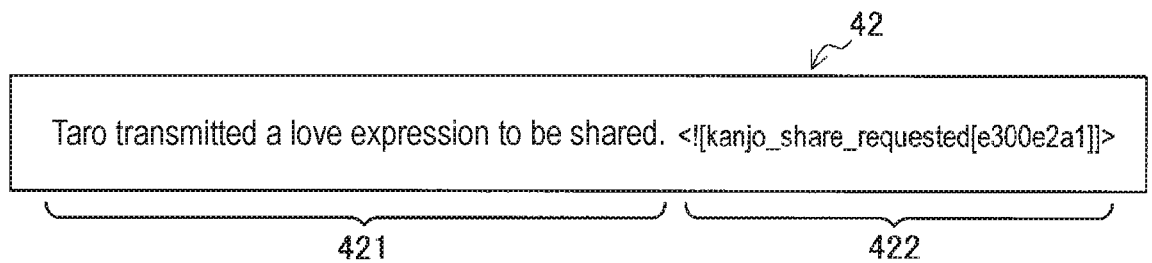
FIG. 16 is a diagram illustrating an example of text information including a request to share a limited love expression message according to the embodiment.

Next, in the case where the love expression utility is installed (YES in Step S239), the information processing device 1 of the sharer side checks whether a request to share a limited love expression message is included in the received text information (Step S212). Here, FIG. 16 illustrates an example of text information including a request to share a limited love expression message. As illustrated in FIG. 16, text information 42 includes a code (sharing request code) 422 and a natural language 421. The code 422 is understandable to the love expression utility, and the natural language 421 indicates that he wants to share the created limited love expression message. For example, the code body "e300e2a1" is represented by using four bytes in hexadecimal. In addition, by using a general communication AP, the code is displayed as it is. However, predetermined symbols and a code noted in brackets after "kanjo_share_requested" may be hidden.

Figure 17:
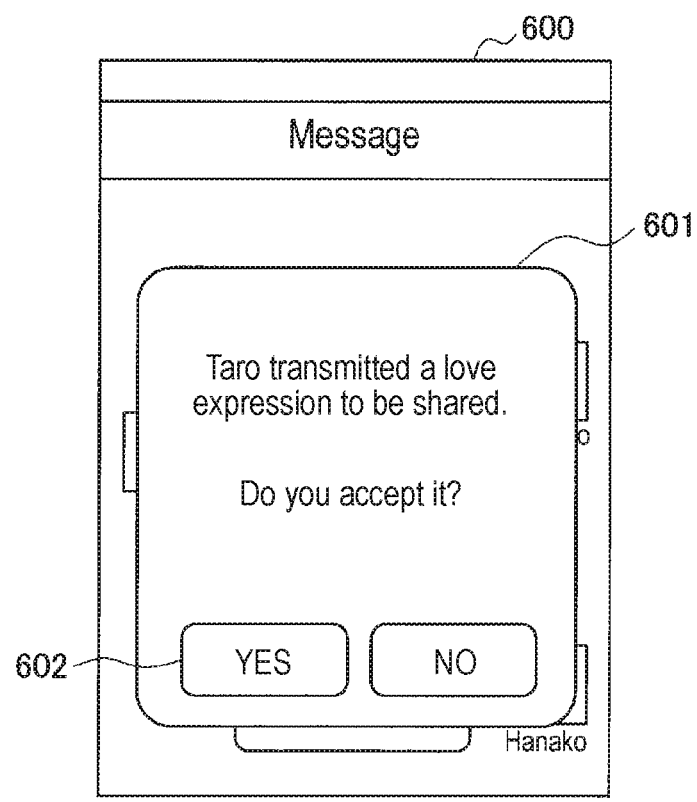
FIG. 17 is a diagram illustrating an example of displaying a leading path to a love expression utility in the case where a sharing request is included according to the embodiment.

Next, in the case where the sharing request is included (YES in Step S242), a leading path to the love expression utility is displayed on a chatting screen of the communication AP (Step S245). Here, FIG. 17 illustrates an example of displaying a leading path to a love expression utility in the case where a sharing request is included. As illustrated in FIG. 17, a message such as "Taro transmitted a love expression to be shared. Do you accept it?" and "YES" and "NO" buttons are displayed on a chatting screen 600. The "YES" button 602 is an example of the leading path to the love expression utility.

Next, in the case where the leading path to the love expression utility is selected (YES in Step S248), the communication AP execution unit 110 calls the love expression utility 100, and passes the sharing request code (Step S251).

Next, when the love expression utility 100 is activated (Step S254), an initial process is performed (Step S257). The initial process is a process of acquiring a love expression table in Steps S118 to S130 illustrated in FIG. 9, and the initial process is executed at a time of initial activation.

Next, the love expression utility 100 decodes the sharing request code passed from the communication AP execution unit 110, and stores the limited love expression in the love expression storage unit 108.

(Process After Transmission)

Next, a process performed in the transmission side terminal after transmitting the love expression message will be described with reference to FIG. 18.

Figure 18:
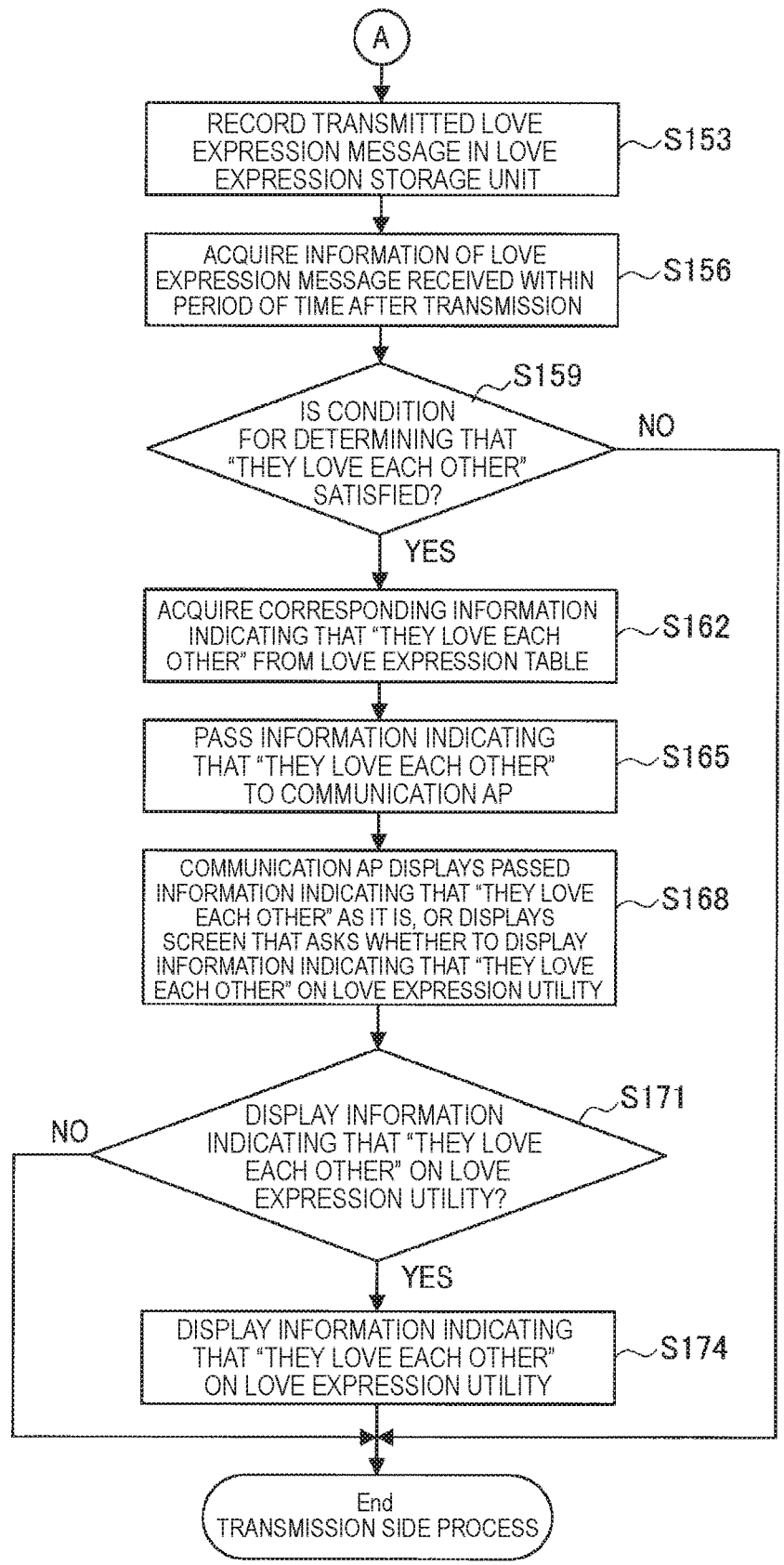
FIG. 18 is a flowchart illustrating a process performed by a transmission side terminal after transmitting a love expression message according to the embodiment.

FIG. 18 is a flowchart illustrating a process performed by a transmission side terminal after transmitting a love expression message according to the embodiment. As illustrated in FIG. 18, the love expression utility 100 first records the transmitted love expression message in the love expression storage unit 108 (Step S153).

Next, after transmission of the love expression message, the love expression utility 100 acquires information of the love expression message received from the partner user within a predetermined period of time (Step S156).

Next, the love expression utility 100 determines whether a condition for determining that "they love each other" is satisfied. In the case where the condition is satisfied (YES in Step S159), corresponding information indicating that "they love each other" is acquired from a love expression table of the love expression storage unit 108 (Step S162).

Next, the love expression utility 100 passes the information indicating that "they love each other" to the communication AP execution unit 110 (Step S165).

Next, the communication AP execution unit 110 the communication AP execution unit 110 displays the passed information indicating that "they love each other" as it is on the chatting screen (specifically, a natural language included in the text information), or displays a screen that asks whether to display the expression indicating that "they love each other" on the love expression utility (Step S168).

Next, in the case where an instruction to perform display on the love expression utility is issued (YES in Step S171), the love expression utility 100 displays information indicating that "they love each other" (specifically, corresponding animation image) (Step S174).

<3-2. Love Expression Reception Process>

Next, with reference to FIG. 19, a process performed by a partner side terminal that has received the converted text information transmitted in Step S148 of FIG. 9 will be described.

Figure 19:
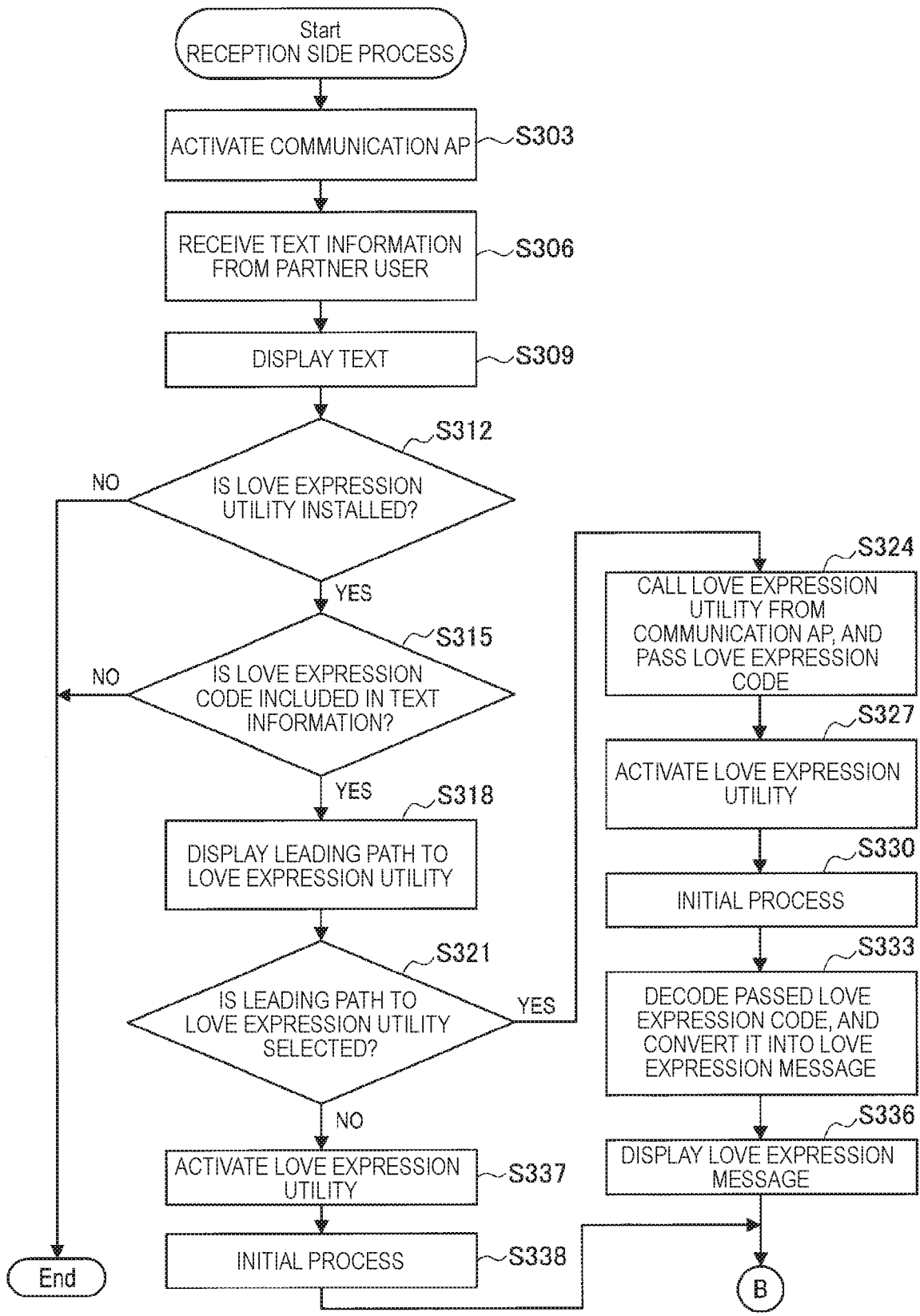
FIG. 19 is a flowchart illustrating a reception side process of a love expression message according to the embodiment.

FIG. 19 is a flowchart illustrating a reception side process of a love expression message according to the embodiment. As illustrated in FIG. 19, the information processing device 1 first activates the communication AP (Step S303).

Next, text information is received from the partner user (Step S306), and a text is displayed (Step S309). Here, FIG. 20 illustrates examples of display of texts. In a chatting screen 610 in the left side of FIG. 20, the love expression message received from the partner user is displayed as it is. In other words, all of the texts including the love expression code are displayed. A chatting screen 620 in the right side of FIG. 20 is displayed while the love expression code is hidden. Any of the display methods can be used in the communication AP.

Next, the information processing device 1 checks whether the love expression utility is installed (Step S312). In the case where the love expression utility is installed (YES in Step S312), the information processing device 1 checks whether a love expression code is included in the text information (Step S315).

Next, in the case where the love expression code is included (YES in Step S315), the communication AP execution unit 110 displays a leading path to the love expression utility (Step S318).

Next, when the leading path to the love expression utility is selected (YES in Step S321), the communication AP execution unit 110 calls the love expression utility 100, and passes the love expression code (Step S324). When the love expression utility 100 is activated through calling (Step S327), an initial process is performed first (Step S330). The initial process is a process of acquiring a love expression table in Steps S118 to S130 illustrated in FIG. 9, and the initial process is executed at a time of initial activation.

On the other hand, in the case where the leading path to the love expression utility is not selected (NO in Step S321), the control unit 10 activates the love expression utility 100 in the background (Step S337), and performs an initial process in a similar way (Step S338). The control unit 10 activates the love expression utility 100 in the background for performing a process of determining a condition for determining that they love each other to be described later with reference to FIG. 28 even in the case where the leading path to the love expression utility is not selected, and for displaying information indicating that "they love each other" on the communication AP in the case where the expression matches an expression indicating that they love each other.

Next, the text/love expression conversion unit 106 of the love expression utility 100 decodes the love expression code that is passed from the communication AP execution unit 110 and acquired by the text acquisition unit 105, and converts it into a love expression message (Step S333).

Subsequently, the love expression output control unit 107 performs control such that the converted love expression message is displayed (Step S336).

Here, with reference to FIG. 21 to FIG. 23, a method for calling a love expression message according to the embodiment will be described. In an example illustrated in FIG. 21, an "open the love expression message" button 361 is displayed on a chatting screen 360 as a leading path to the love expression utility. The chatting screen 360 is displayed by the communication AP. When the button 361 is tapped, the love expression utility 100 is called, and an animation image 641 indicating a corresponding love expression message is displayed as illustrated in a screen 640.

Figure 22:
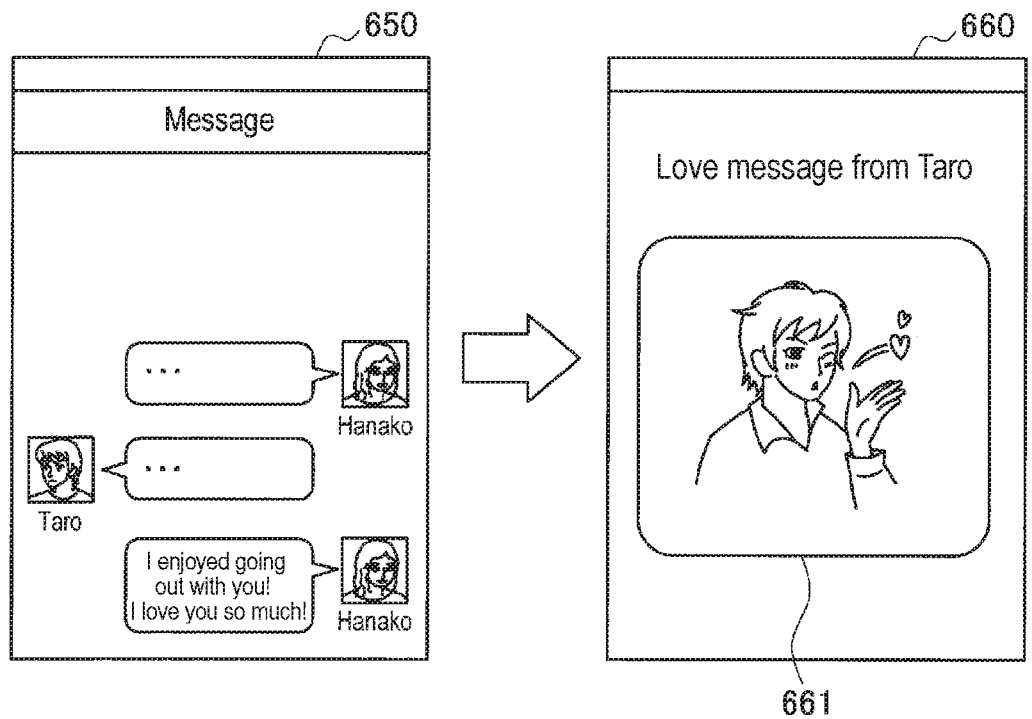
FIG. 22 is a diagram illustrating another method for calling a love expression message according to the embodiment.

On the other hand, in an example illustrated in FIG. 22, the communication AP displays no leading path on the chatting screen 630. Immediately after receiving a love expression message, the love expression utility 100 is called automatically, and an animation image indicating the corresponding love expression message is displayed as illustrated in a screen 660.

Figure 23:
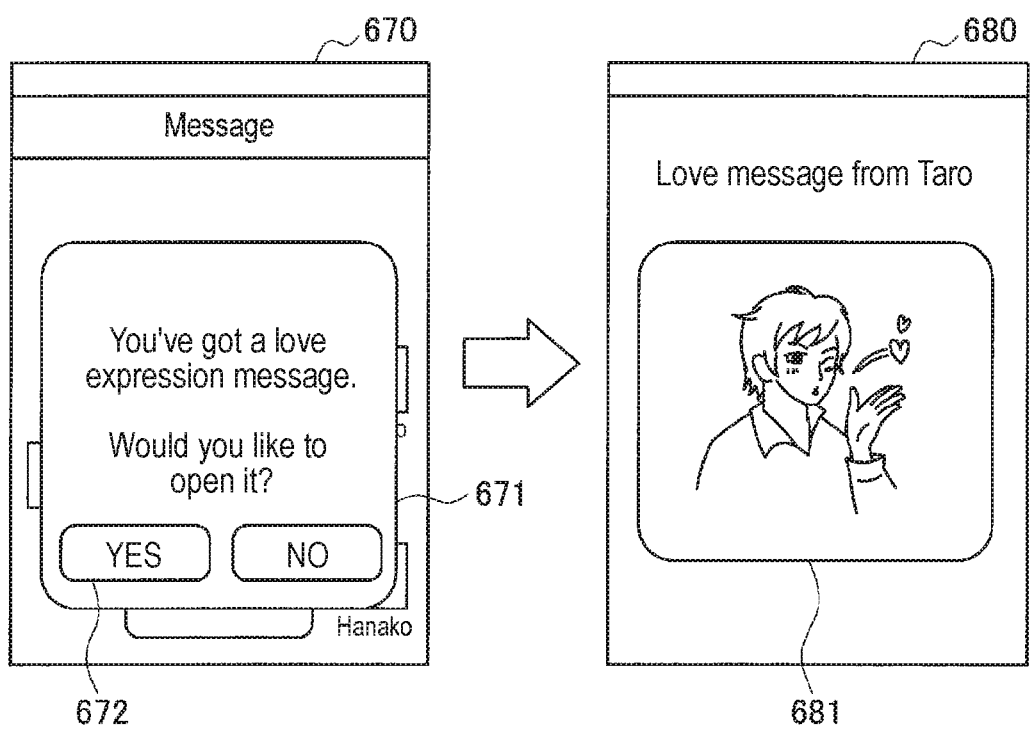
FIG. 23 is a diagram illustrating another method for calling a love expression message according to the embodiment.

Alternatively, in an example illustrated in FIG. 23, a pop-up screen 671 showing a message "You've got a love expression message. Would you like to open it?" is displayed on a chatting screen 670 displayed by the communication AP, and a "YES" button 672 is displayed as a leading path to the love expression utility. When the button 672 is tapped, the love expression utility 100 is called, and an animation image 681 indicating a corresponding love expression message is displayed as illustrated in a screen 680.

(Specific Examples of Love Expression Message)

Next, with reference to FIG. 24 to FIG. 27, specific examples of the love expression message will be described. FIG. 24 to FIG. 27 are natural language display examples (displayed on communication AP) indicating examples of a love expression message, and animation image examples (displayed on love expression utility) according to the embodiment.

Figure 24:
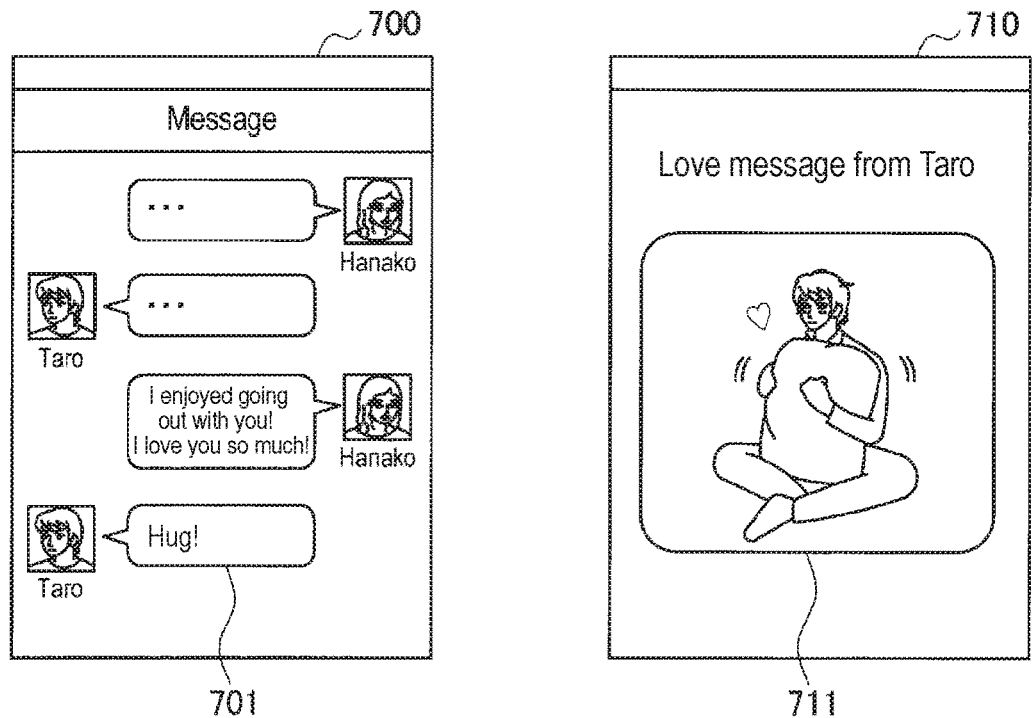
FIG. 24 is a natural language display example indicating an example of a love expression message, and an animation image example according to the embodiment.

The example illustrated in FIG. 24 is a love expression example at a time when the touch sensor 13 detects that the information processing device 1 is clutched. A chatting screen 700 illustrated on the left side in FIG. 24 is a screen displayed on the communication AP, and a natural language "hug!" is displayed as a love expression indicating the clutching. On the other hand, in the case where the display is performed by the love expression utility, a an animation image 711 of a person hugging a pillow is displayed as illustrated in a screen 710 on the right side of FIG. 24. In addition, at this time, a sound effect "hug" is output from a speaker (not illustrated) of the information processing device 1, and long vibration is output from a vibration unit (not illustrated) to emphasize the love expression of the hug.

Figure 25:
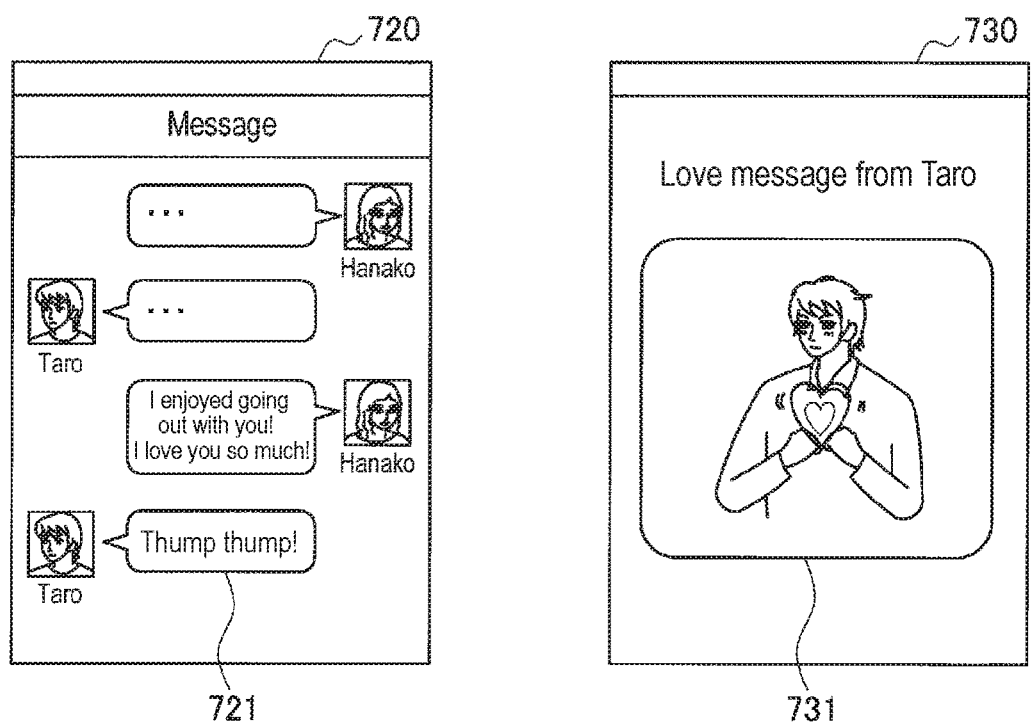
FIG. 25 is a natural language display example indicating an example of a love expression message, and an animation image example according to the embodiment.

The example illustrated in FIG. 25 is a love expression example at a time when the information processing device 1 is attached to the chest of the user and heartbeat sound is collected via the microphone 12. A chatting screen 720 illustrated on the left side in FIG. 25 is a screen displayed on the communication AP, and a natural language "thump thump!" is displayed as a love expression indicating heartbeat sound to be listened by the partner. On the other hand, in the case where the display is performed by the love expression utility, an animation image 731 of a person with his heart thumping is displayed as illustrated in a screen 730 on the right side of FIG. 25. In addition, at this time, a sound effect "thump thump!" is output from the speaker (not illustrated) of the information processing device 1, and short vibrations are repeatedly output from the vibration unit (not illustrated) to emphasize the situation of his heart thumping.

Figure 26:
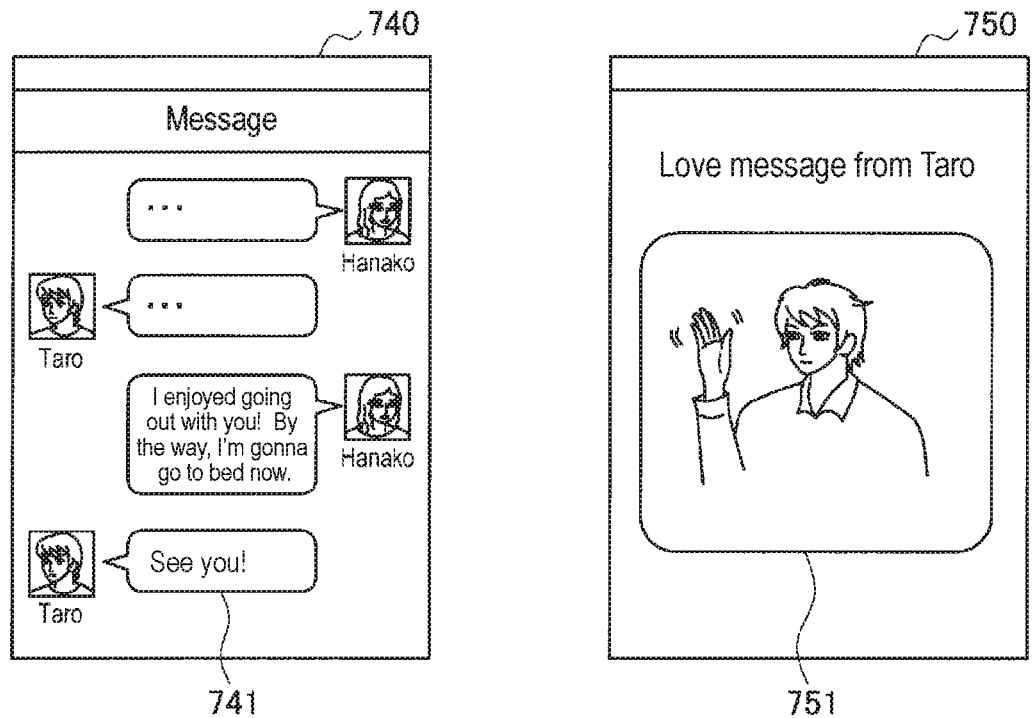
FIG. 26 is a natural language display example indicating an example of a love expression message, and an animation image example according to the embodiment.

The example illustrated in FIG. 26 is an expression example at a time when the acceleration sensor 14 detects that the information processing device 1 is held and shaken by the user. A chatting screen 740 illustrated on the left side in FIG. 26 is a screen displayed on the communication AP, and a natural language "See you!" is displayed as an expression indicating a waving hand. On the other hand, in the case where the display is performed by the love expression utility, an animation image 751 of a waving hand is displayed as illustrated in a screen 750 illustrated on the right side of FIG. 26. In addition, at this time, short vibrations are repeatedly output from the vibration unit (not illustrated) of the information processing device 1 the same number of times as the number of times the user has shaken the information processing device 1 to emphasize the situation of waving his hand.

Figure 27:
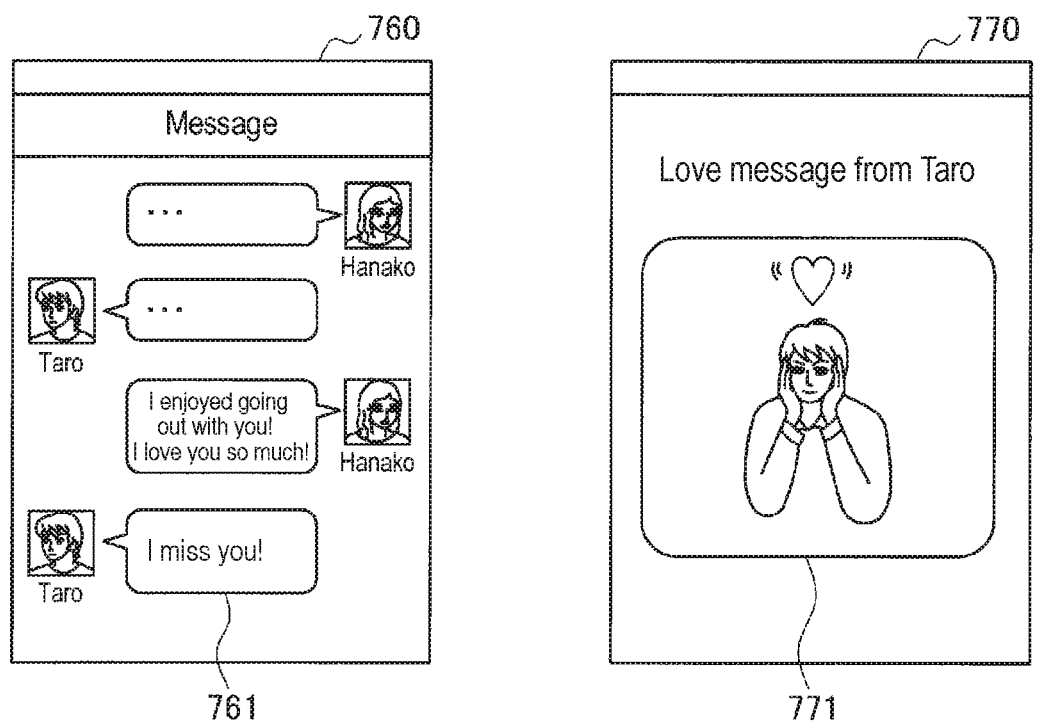
FIG. 27 is a natural language display example indicating an example of a love expression message, and an animation image example according to the embodiment.

The specific examples of versatile love expression messages have been described above. Next, FIG. 27 illustrates an example of a limited love expression message. The example illustrated in FIG. 27 is an expression example at the time when the touch sensor 13 (touchscreen display 16) is tapped three times. A chatting screen 760 illustrated on the left side in FIG. 27 is a screen displayed on the communication AP. The limited love expression of tapping the screen three times is displayed as a natural language "I miss you!" that is recognized with reference to the limited love expression table and included in text information. On the other hand, in the case where the display is performed by the love expression utility, an animation image 771 of a person looking at a partner is displayed as a registered limited love expression exclusively for the partner and the user as illustrated in a screen 770 on the right side of FIG. 27.

(Process After Display)

Figure 28:
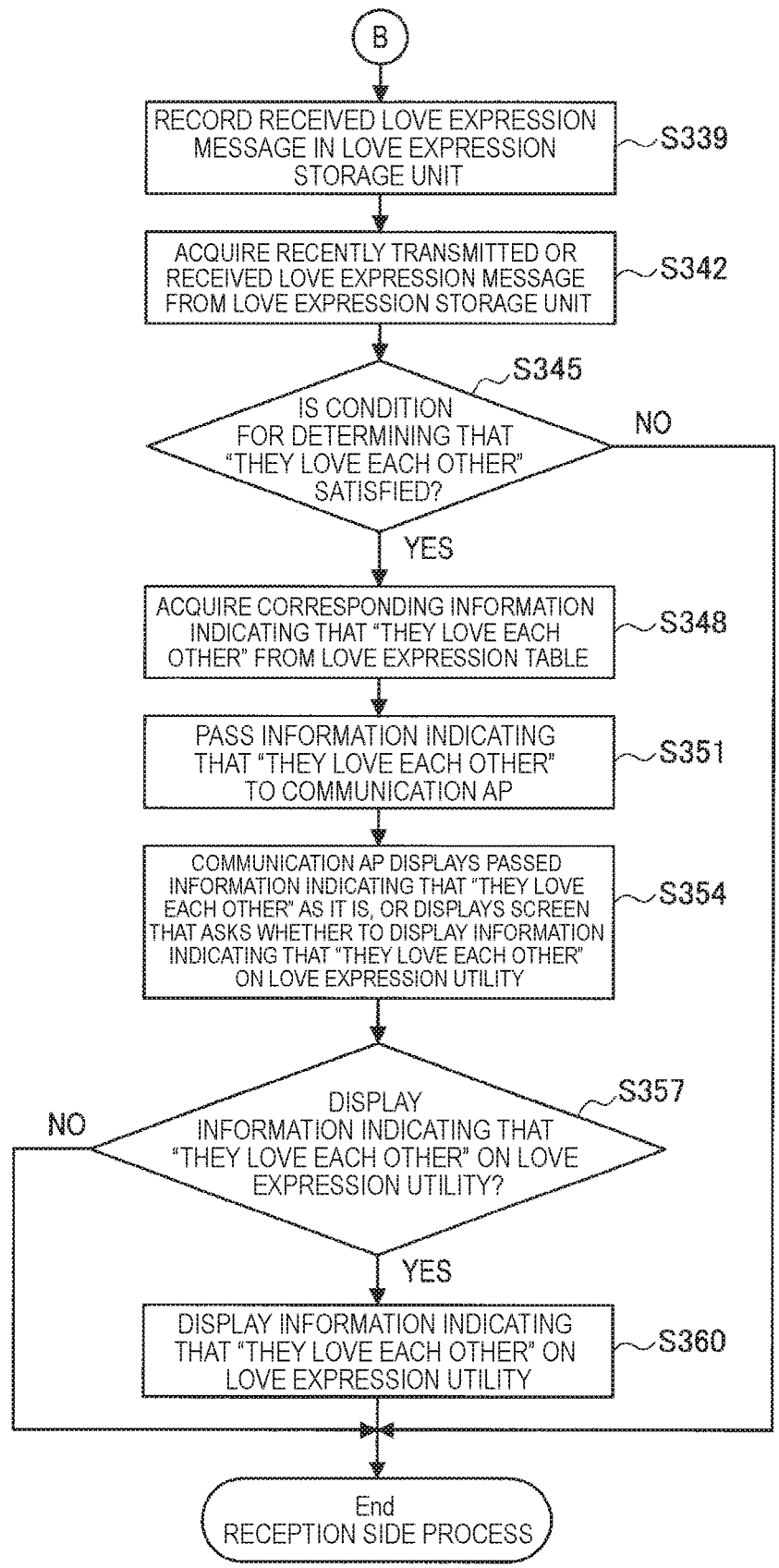
FIG. 28 is a flowchart illustrating a process performed by a reception side terminal after displaying a love expression message according to the embodiment.

Next, a process performed in the reception side terminal after displaying the love expression message will be described with reference to FIG. 28. FIG. 28 is a flowchart illustrating a process performed by the reception side terminal after displaying a love expression message according to the embodiment.

As illustrated in FIG. 28, the love expression utility 100 first records the received love expression message in the love expression storage unit 108 (Step S339).

Next, the love expression utility 100 acquires a recently transmitted or received love expression message from the love expression storage unit 108 (Step S342).

Next, the love expression utility 100 determines whether a condition for determining that "they love each other" is satisfied. In the case where the condition is satisfied (YES in Step S345), corresponding information indicating that "they love each other" is acquired from a love expression table of the love expression storage unit 108 (Step S348).

Next, the love expression utility 100 passes the information indicating that "they love each other" to the communication AP execution unit 110 (Step S351).

Next, the communication AP execution unit 110 the communication AP execution unit 110 displays the passed information indicating that "they love each other" as it is on the chatting screen (specifically, a natural language included in the text information), or displays a screen that asks whether to display the expression indicating that "they love each other" via the love expression utility (Step S354).

Next, in the case where an instruction to perform display on the love expression utility is issued (YES in Step S357), the love expression utility displays information indicating that "they love each other" (specifically, corresponding animation image) (Step S360).

(Method for Calling Love Expression Message)

Figure 29:
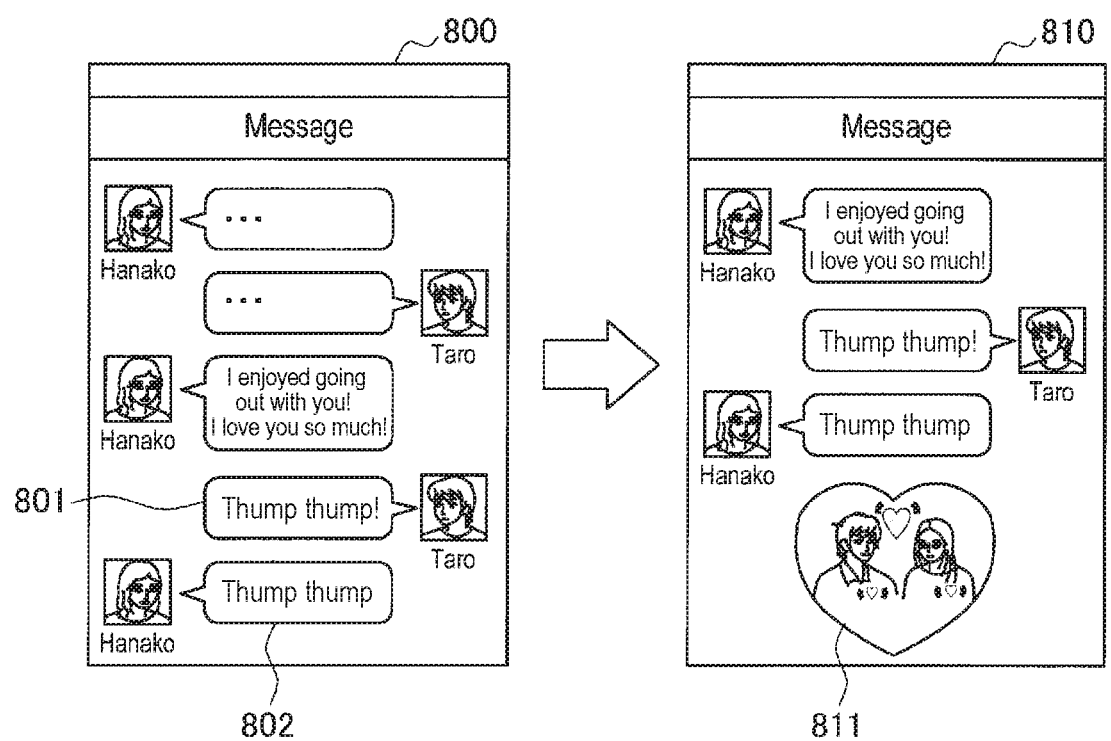
FIG. 29 is a diagram illustrating a method for calling a love expression message indicating that they love each other according to the embodiment.

Here, with reference to FIG. 29 to FIG. 30, a method for calling a love expression message indicating that they love each other will be described. As illustrated in the left side of FIG. 29, in a chatting screen 800 displayed by the communication AP, it is determined whether a condition that they love each other is satisfied when one user transmits a love expression message 801 (here, natural language) and the other user transmits the same love expression message 802 within a predetermined period of time. In the case where the condition that they love each other is satisfied, as illustrated in the right side of FIG. 29, an animation image 811 corresponding to the love expression message indicating that they love each other may be displayed on a chatting screen 810. In FIG. 29, the example of calling and displaying the love expression message indicating that they love each other on the communication AP has been described. However, the embodiment is not limited thereto. It is also possible to perform display on the love expression utility. Next, the following description will be given with reference to FIG. 30.

Figure 30:
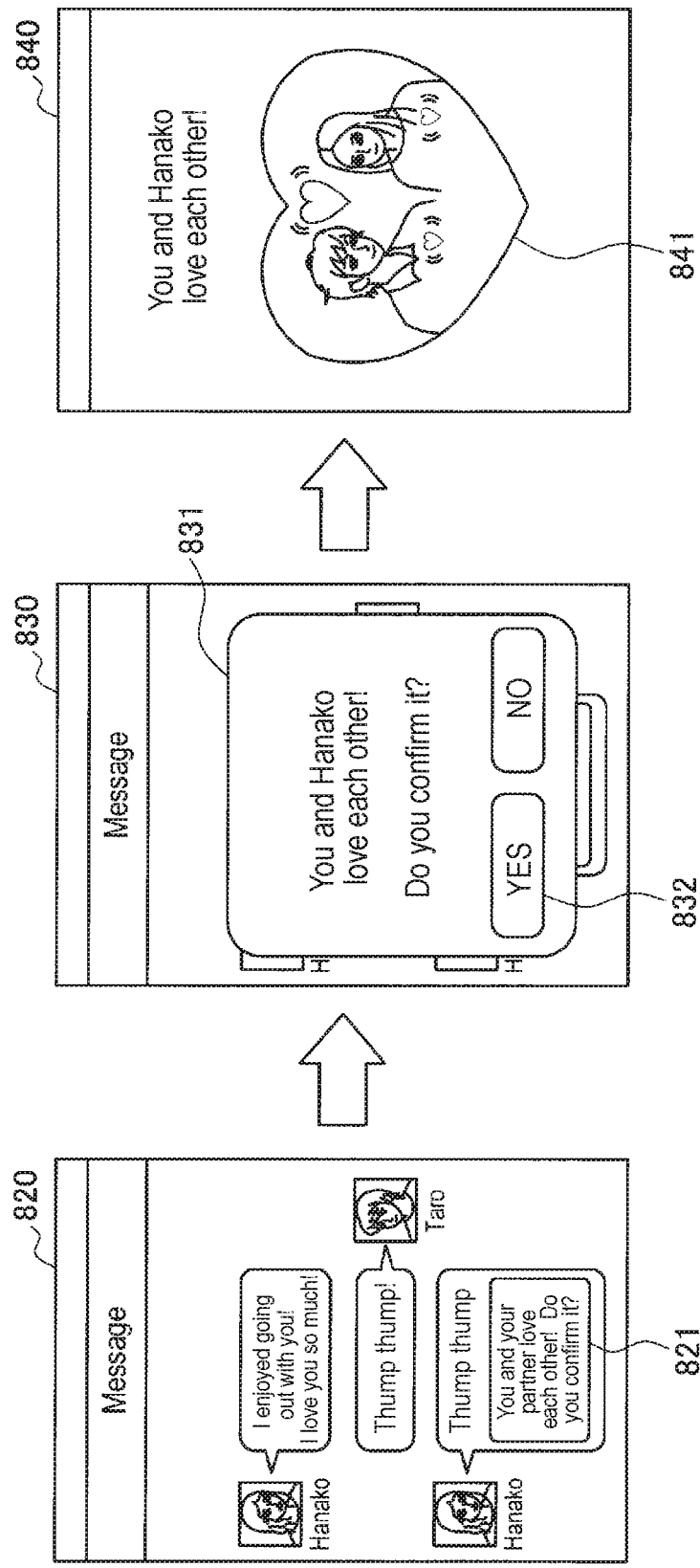
FIG. 30 is a diagram illustrating another method for calling a love expression message indicating that they love each other according to the embodiment.

As illustrated in the left side of FIG. 30, when it is determined that the condition that they love each other is satisfied, a button 821 indicating that "You and your partner love each other! Do you confirm it?" is displayed on the chatting screen 820. Next, when the button 821 is tapped, as illustrated in the middle of FIG. 30, the chatting screen 830 displays a message indicating that "You and Hanako love each other! Do you confirm it?" and "YES" and "NO" buttons are displayed. The "YES" button 832 is an example of the leading path to the love expression utility.

When the "YES" button 832 is selected, the love expression utility 100 is called and activated, and an animation image 841 corresponding to the love expression message indicating that they love each other is displayed on a display screen 840 under the control of the love expression utility 100 as illustrated in the right side of FIG. 3.

(Specific Examples of Love Expression Indicating that They Love Each Other)

Next, with reference to FIG. 7, specific examples of love expressions indicating that they love each other will be described.

A versatile love expression table illustrated in FIG. 7 is a table related to love expression information indicating that they love each other. In the first row of the love expression table illustrated in FIG. 7, an animation image and a BGM/sound effect (such as romantic music) to be displayed in the case where both users transmit a love expression message by blowing a kiss are shown. For example, the determination condition is defined as a condition that one user transmits a love expression message by blowing a kiss to the camera 11 or the microphone 12 and then a partner replies the same love expression within a predetermined period of time.

In addition, in the second row of the love expression table illustrated in FIG. 7, an animation image and a BGM/sound effect (such as romantic music) to be displayed in the case where both users transmit a love expression message by clutching devices. For example, the determination condition is defined as a condition that one user transmits a love expression message by clutching the information processing device 1 by both hands and then a partner replies the same love expression within a predetermined period of time.

In addition, in the third row of the love expression table illustrated in FIG. 7, an animation image and a BGM/sound effect (such as romantic music) to be displayed in the case where both users transmit a love expression message by recording heartbeats of his/her chest. For example, the determination condition is defined as a condition that one user transmits a love expression message by attaching the information processing device 1 to his/her chest and recording heartbeats through the microphone 12 and then a partner replies the same love expression within a predetermined period of time. In addition, the determination condition may be limited more strictly such that a condition that rhythms of their heartbeats are within a predetermined value is added as the determination condition.

In addition, in the fourth row of the love expression table illustrated in FIG. 7, an animation image and a BGM/sound effect (such as romantic music) to be displayed in the case where both users transmit a love expression message by waving his/her hand. For example, the determination condition is defined as a condition that one user transmits a love expression message by holding and shaking the information processing device 1, the acceleration sensor 14 detects this movement, and then a partner replies the same love expression within a predetermined period of time. In addition, the determination condition may be limited more strictly such that a condition that the number of times one user has shaken the device is the same as the number of times the other user shaken the device is added as the determination condition.

In addition, in the case of a limited love expression message, it is determined that "they love each other" when a predetermined condition is satisfied, and it is possible to perform display to inform that they love each other. Specifically, as illustrated in FIG. 8, an animation image and a BGM/sound effect (such as romantic music) to be displayed in the case where both users transmit a love expression message by tapping touchscreens of the information processing devices 1 three times are shown. The tapping the touchscreen of the information processing device 1 is a limited love expression that has been registered. For example, the determination condition is defined as a condition that one user transmits a love expression message by making a predetermined movement and then a partner replies the same love expression within a predetermined period of time.

<3-3. Live Streaming Process>

Next, with reference to FIG. 31 to FIG. 34, a live streaming process will be described. In the case where it is possible for the communication AP to provide a live streaming transmission/reception function, it is also possible for the love expression utility to transmit/receive streaming love expression messages by using such a function.

(3-4-1. Transmission Side Process)

Figure 31:
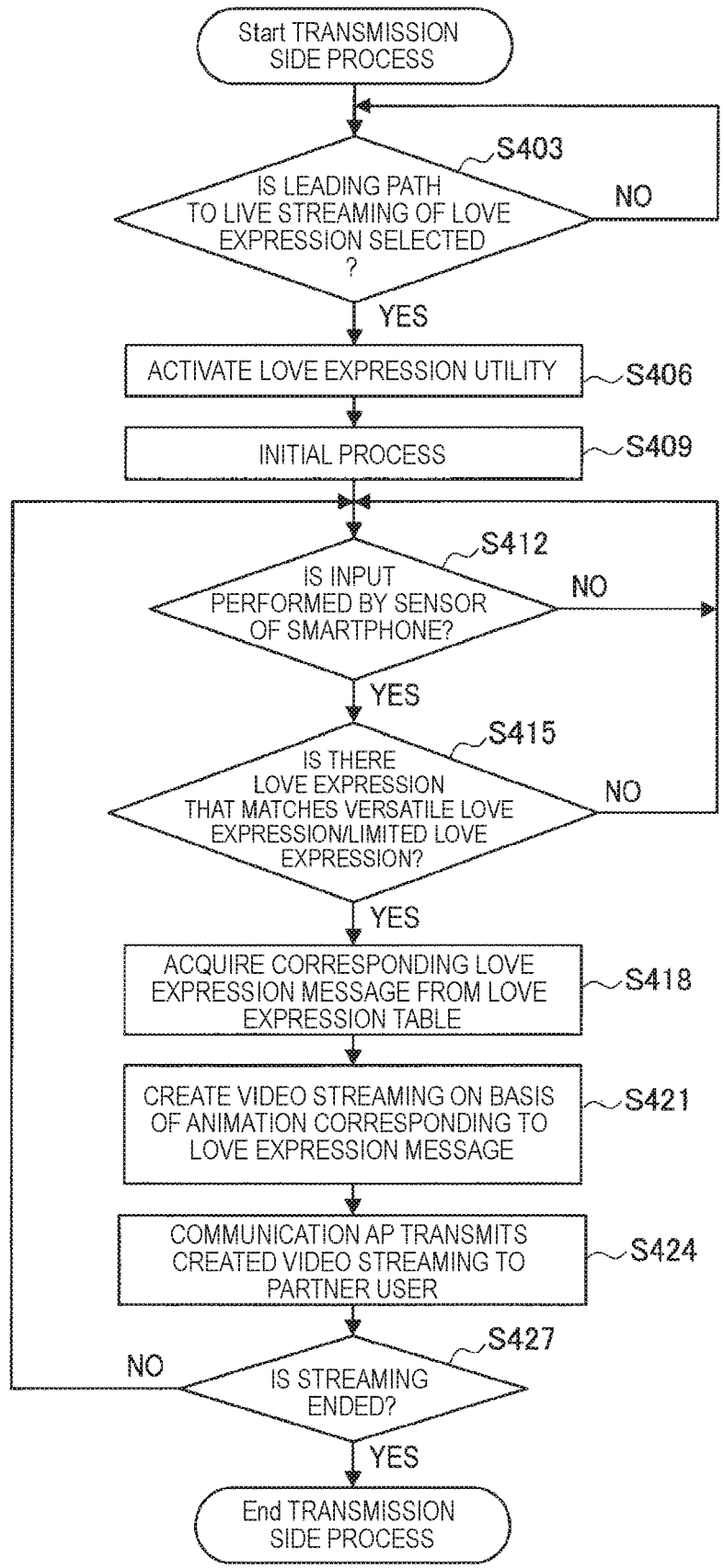
FIG. 31 is a flowchart illustrating a transmission side process of live streaming of a love expression message according to the embodiment.

FIG. 31 is a flowchart illustrating a transmission side process of live streaming of a love expression message according to the embodiment. As illustrated in FIG. 31, the communication AP execution unit 110 first determines whether a leading path to live streaming of a love expression is selected (Step S403).

Next, in the case where the leading path to the live streaming of the love expression is selected (YES in Step S403), the communication AP execution unit 110 calls the love expression utility 100, and activates the love expression utility 100 (Step S406).

Figure 32:
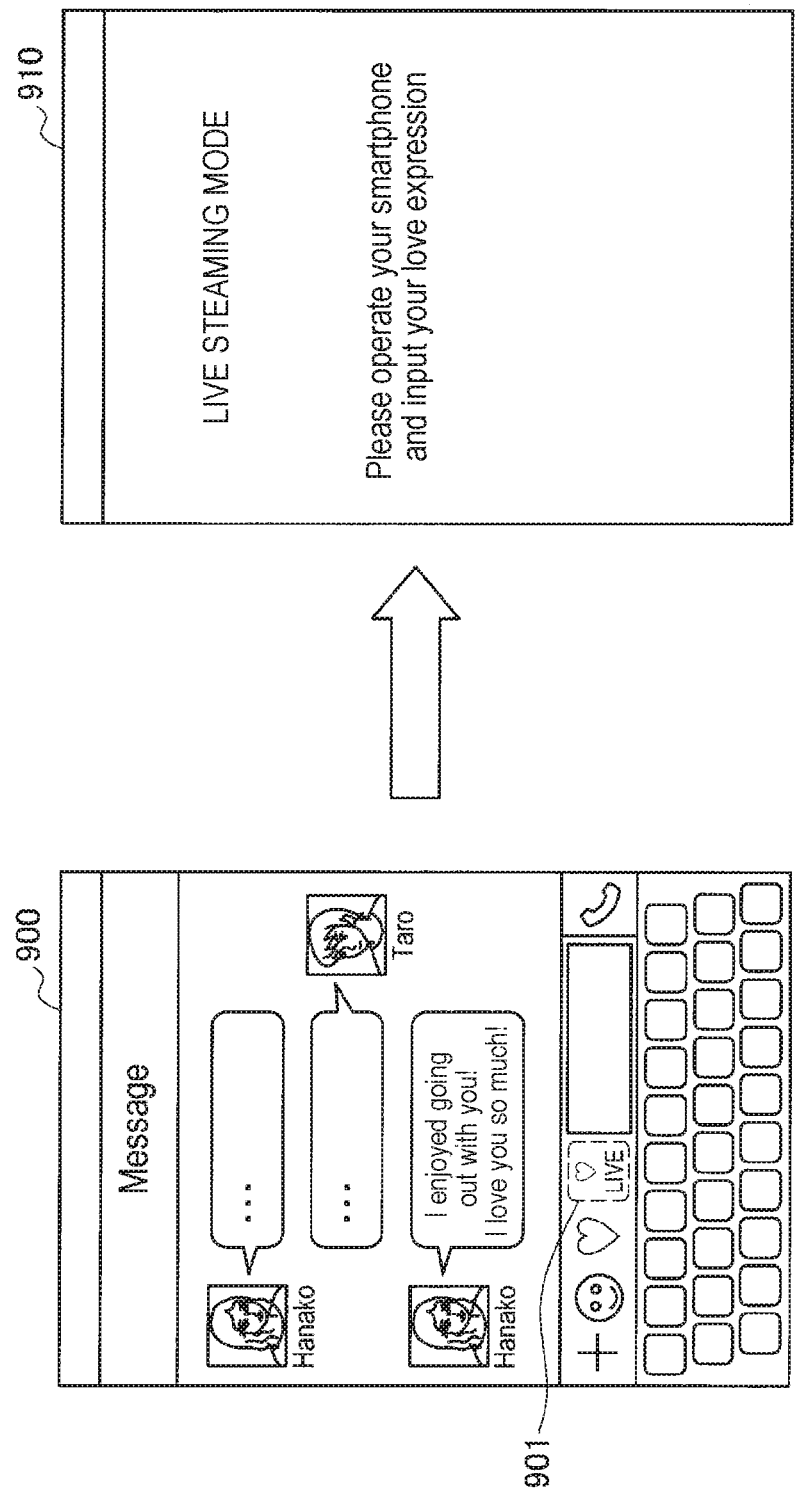
FIG. 32 is a diagram illustrating an example of displaying a leading path to a love expression utility according to the embodiment.

Next, the love expression utility 100 performs an initial process (Step S409). The initial process is a process of acquiring a love expression table in Steps S118 to S130 illustrated in FIG. 9, and the initial process is executed at a time of initial activation. Here, FIG. 32 illustrates a screen display example according to the embodiment. As illustrated in the left side of FIG. 32, the communication AP displays a chatting screen 900 including text messages, and further displays a call button 901 serving as the leading path to live streaming to be performed by the love expression utility. When the call button 901 is tapped, a display screen 910 is displayed by the love expression utility as illustrated in the right side of FIG. 32. In the display screen 910, a message "LIVE STEAMING MODE Please operate your smartphone and input your love expression" is displayed.

Next, in the case where the user makes a physical love expression such as clutching or shaking the information processing device 1 and data detected by various sensors is input into the sensor data acquisition unit 101 (YES in Step S412), the love expression extraction unit 102 refers to the love expression storage unit 108, and determines whether there is a love expression that matches a versatile love expression/limited love expression on the basis of the sensor data (Step S415).

Next, in the case where there is a matched love expression (YES in Step S415), the love expression extraction unit 102 acquires a corresponding love expression from a table (Step S418).

Next, the love expression utility 100 creates video streaming on the basis of an animation image corresponding to the acquired love expression message, and passes it to the communication AP execution unit 110 (Step S421).

Next, the communication AP execution unit 110 transmits the passed video streaming to a partner communicating with via the chatting screen (Step S424).

Next, the information processing device 1 repeats the process (creation and transmission of video streaming) in Step S412 to S424 described above until an instruction to end the streaming is issued (Step S427).

(3-4-2. Reception Side Process)

Figure 33:
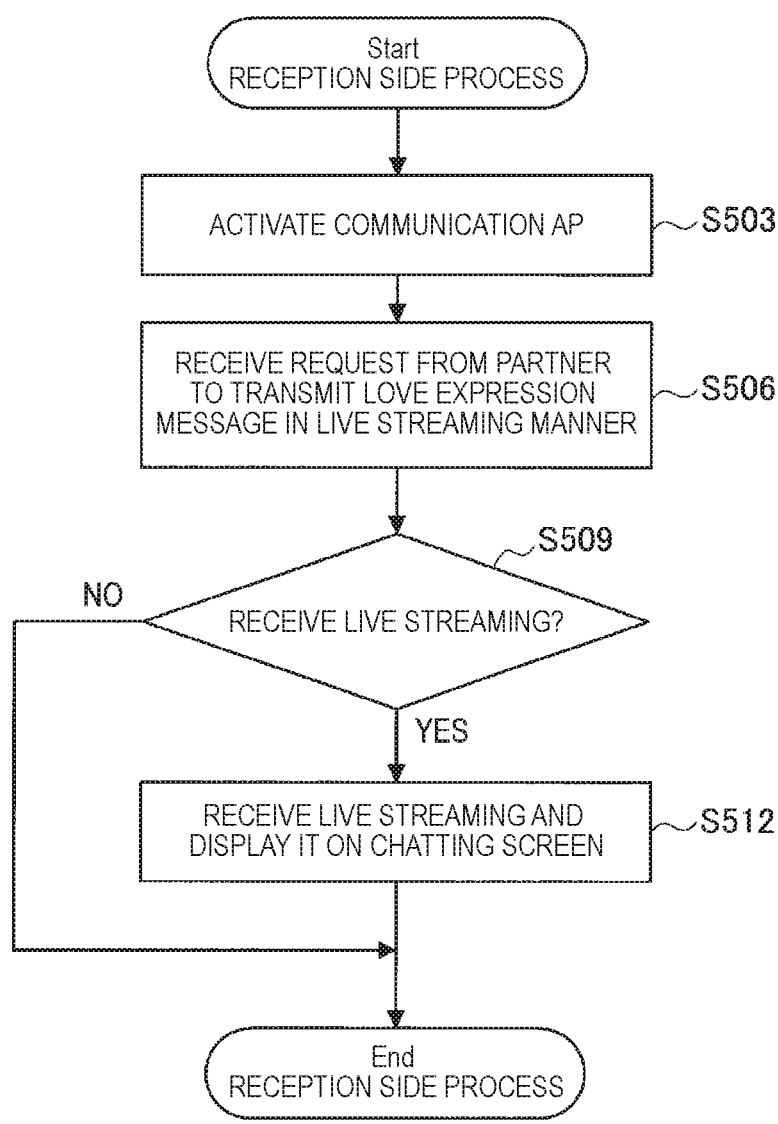
FIG. 33 is a flowchart illustrating a reception side process of live streaming of a love expression message according to the embodiment.

FIG. 33 is a flowchart illustrating a reception side process of live streaming of a love expression message according to the embodiment.

As illustrated in FIG. 33, the information processing device 1 first activates the communication AP (Step S503).

Next, the communication AP execution unit 110 receives a request to transmit a love expression message in a live streaming manner (Step S506).

Next, it is determined whether to receive the live streaming (Step S509). In the case of receiving the live streaming (YES in Step S509), the live streaming is received and displayed on the chatting screen (Step S512). Here, with reference to FIG. 34, an example of a method for calling a live streaming video of a love expression message according to the embodiment will be described.

Various kinds of leading paths can be used as the method for calling a live streaming video, depending on the specification of the communication AP. For example, as illustrated in a chatting screen 920 on the upper left side of FIG. 34, it is possible to display a reproduction button 921 of a love expression message video. Alternatively, as illustrated in a chatting screen 930 on the lower left side of FIG. 34, it is possible to display a pop-up screen 931 including a message "You've got live streaming of a love message. Would you like to open it?" and "YES" and "NO" buttons.

Figure 34:
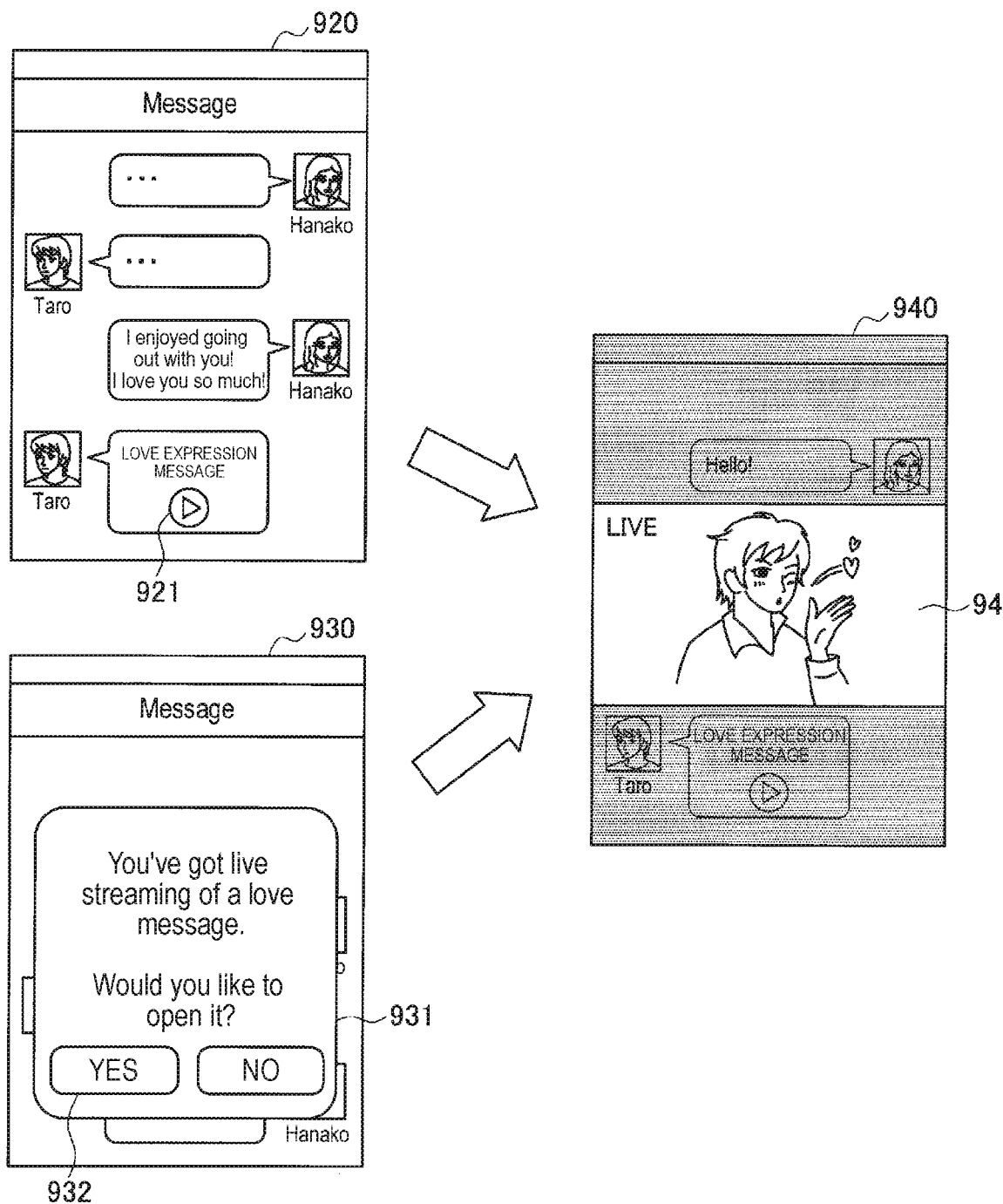
FIG. 34 is a diagram illustrating a method for calling a live streaming video of a love expression message according to the embodiment.

In the case where the reproduction button 921 in the chatting screen 920 or the "YES" button 932 in the chatting screen 930 are tapped, as illustrated in the right side of FIG. 34, the communication AP execution unit 110 reproduces a live streaming image 941 of the love expression on a chatting screen 940. Note that, in the case of transmitting live streaming as general video streaming, it is not necessary for the reception side to install a special system such as the love expression utility 100 or the like.

4. CONCLUSION

As described above, when using the information processing system according to the embodiment, it is possible to transmit physical expression information of a user via a versatile communication application.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, ROM, and RAM, which are embedded in the above described information processing device 1 or expression management server 2, to execute the functions of the information processing device 1 or the expression management server 2. Moreover, it is possible to provide a computer-readable recording medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication system including:

a control unit configured to execute a communication application for directly or indirectly transmitting and receiving text information to and from a communication destination; and a communication unit configured to directly or indirectly transmit text information acquired via the communication application, to a communication destination, in which the control unit activates a utility in response to a request from the communication application, and the utility acquires sensor data detected by a sensor, extracts specific expression information from the sensor data, converts the specific expression information into text information, and outputs the text information to the communication application.

(2)

The communication system according to (1), in which the control unit activates the utility at a timing when the communication application outputs a message input screen.

(3)

The communication system according to (1), in which the control unit activates the utility at a timing of selecting a leading path to the utility displayed on a message input screen of the communication application.

(4)

The communication system according to any one of (1) to (3), in which the utility executed by the control unit converts the specific expression information into text information in accordance with an expression table stored in advance.

(5)

The communication system according to (4), in which the control unit acquires a latest expression table stored in an external server via the communication unit.

(6)

The communication system according to (4) or (5), in which the expression table includes versatile love expression information, or limited love expression information applied to between specific users.

(7)

The communication system according to any one of (1) to (6), in which the utility executed by the control unit converts the specific expression information into text information including a natural language and a code understandable to the utility.

(8)

The communication system according to any one of (1) to (7), in which the utility detects any of blowing on a device, clutching a device by a hand, pressing a device to a chest, and waving a hand, as the specific expression information.

(9)

The communication system according to any one of (1) to (8), in which the control unit activates a utility in response to a request from the communication application that has received a message, and the utility performs control such that a code understandable to the utility is extracted from the received message, the code is converted into specific expression information, and the specific expression information is expressed to a user.

(10)

The communication system according to any one of (1) to (9), in which, after directly or indirectly transmitting text information indicating the specific expression information to a communication destination via the communication unit, the control unit performs control such that expression information indicating that users have a same feeling is expressed to the user when reception of a code indicating same expression information as the transmitted specific expression information is detected from the communication destination within a predetermined period of time.

(11)

A storage medium having a program stored therein, the program causing a computer to function as:
a control unit configured to execute a communication application for directly or indirectly transmitting and receiving text information to and from a communication destination; and
a communication unit configured to directly or indirectly transmit text information acquired via the communication application, to a communication destination, in which
the control unit activates a utility in response to a request from the communication application, and
the utility acquires sensor data detected by a sensor, extracts specific expression information from the sensor data, converts the specific expression information into text information, and outputs the text information to the communication application.

REFERENCE SIGNS LIST 1 information processing device
2 expression management server
3 network
10 control unit
11 camera
12 microphone
13 touch sensor
14 acceleration sensor
16 touchscreen display
17 communication unit
18 storage unit
20 communication unit
21 user management unit
22 love expression management unit
23 versatile love expression DB
24 limited love expression DB
100 love expression utility
101 sensor data acquisition unit
102 love expression extraction unit
103 text conversion unit
104 text output control unit
105 text acquisition unit
106 love expression conversion unit
107 love expression output control unit
108 love expression storage unit
110 communication AP execution unit

The invention claimed is:

1. A communication system, comprising:
a control unit configured to:
execute a communication application, wherein the communication application displays a message input screen at a specific time;
activate a utility at a time concurrent to the specific time at which the communication application displays the message input screen;
acquire sensor data from at least one sensor of a plurality of sensors based on the activation of the utility;
extract first user expression information from the sensor data;
convert the first user expression information into first text information based on an expression table, wherein
the expression table corresponds to a table for specific users, and
the specific users include a first user associated with the communication system and a second user associated with a communication destination; and
output the first text information to the communication application; and
a communication unit configured to:
receive the first text information from the communication application; and transmit the first text information to the communication destination, wherein after the transmission of the first text information to the communication destination, the control unit is further configured to display specific expression information based on reception of a message from the communication destination within a fixed period of time, the specific expression information indicates that the first user expression information and second user expression information are same, the second user expression information is associated with the message, the message comprises second text information including a natural language and a specific code, the specific expression information comprises information, and the information indicates that a feeling associated with the first user is same as a feeling associated with the second user.

2. The communication system according to claim 1, wherein the control unit is further configured to activate the utility at a time of selection of a leading path to the utility, and the leading path to the utility is displayed on the message input screen of the communication application.

3. The communication system according to claim 1, wherein the control unit is further configured to acquire, via the communication unit, a latest expression table, and the latest expression table is stored in an external server.

4. The communication system according to claim 1, wherein the expression table includes one of versatile love expression information or limited love expression information based on the specific users.

5. The communication system according to claim 1, wherein the first text information comprises the natural language and the specific code.

6. The communication system according to claim 1, wherein the control unit is further configured to detect at least one of a blow on a user device, a clutch of hand on the user device, a press on the user device, or a user hand wave as the first user expression information.

7. The communication system according to claim 1, further comprising a display screen, wherein the communication application receives the message from the communication destination, and the control unit is further configured to:
extract the specific code from the received message;
convert the specific code into the second user expression information; and
display the second user expression information on the display screen.

8. A non-transitory computer-readable medium having stored thereon computer-executable instructions which, when executed by a computer, cause the computer to execute operations, the operations comprising:

executing a communication application, wherein the communication application displays a message input screen at a specific time;

activating a utility at a time concurrent to the specific time at which the communication application displays the message input screen;

acquiring sensor data from at least one sensor of a plurality of sensors based on the activation of the utility;

extracting first user expression information from the sensor data;

converting the first user expression information into first text information based on an expression table, wherein the expression table corresponds to a table for specific users, and the specific users include a first user associated with a communication system, and a second user associated with a communication destination;

outputting the first text information to the communication application;

receiving the first text information from the communication application;

transmitting the first text information to the communication destination; and after transmitting the first text information to the communication destination, displaying specific expression information based on reception of a message from the communication destination within a fixed period of time, wherein the specific expression information indicates that the first user expression information and second user expression information are same, the second user expression information is associated with the message, the message comprises second text information including a natural language and a specific code, the specific expression information comprises information, and the information indicates that a feeling associated with the first user is same as a feeling associated with the second user.

9. A communication system, comprising:

a control unit configured to:
receive a request from a communication application based on execution of the communication application;

acquire sensor data from at least one sensor of a plurality of sensors based on the received request;

extract first user expression information from the sensor data;

convert the first user expression information into first text information based on an expression table, wherein the expression table corresponds to a table for specific users, and the specific users include a first user associated with the communication system, and a second user associated with a communication destination; and output the first text information to the communication application; and a communication unit configured to:
receive the first text information from the communication application; and transmit the first text information to the communication destination, wherein the communication application receives a message from the communication destination, after the transmission of the first text information to the communication destination, the control unit is further configured to display specific expression information based on the message received within a fixed period of time, the specific expression information indicates that the first user expression information and second user expression information are same, the second user expression information is associated with the message, the message comprises second text information including a natural language and a specific code, the specific expression information comprises information, and the information indicates a feeling associated with the first user is same as a feeling associated with the second user.

\* \* \* \* \*